US009336304B2

(12) United States Patent  
Speier

(10) Patent No.: US 9,336,304 B2  
(45) Date of Patent: May 10, 2016

(54) PATENT ANALYTICS SYSTEM

(76) Inventor: Gary J. Speier, Eden Prairie, MN (US)

(*) Notice: Subject to any disclaimer, the term of this patent is extended or adjusted under 35 U.S.C. 154(b) by 676 days.

(21) Appl. No.: 12/616,040

(22) Filed: Nov. 10, 2009

(65) Prior Publication Data

US 2010/0180223 A1 Jul. 15, 2010

Related U.S. Application Data

(60) Provisional application No. 61/113,114, filed on Nov. 10, 2008, provisional application No. 61/115,284, filed on Nov. 17, 2008.

(51) Int. Cl.
*G06F 15/00* (2006.01)
*G06F 13/00* (2006.01)
*G06F 17/30* (2006.01)

(52) U.S. Cl.
CPC ...... *G06F 17/30716* (2013.01); *G06F 2216/11* (2013.01)

(58) Field of Classification Search
CPC .................................................. G06F 17/30716
USPC ................. 715/726, 779, 739, 855, 751–753, 715/783–785, 763–765, 851–853
See application file for complete search history.

(56) References Cited

U.S. PATENT DOCUMENTS

| 5,754,840 | A | 5/1998 | Rivette et al. |
| 5,774,833 | A | 6/1998 | Newman |
| 5,991,780 | A | 11/1999 | Rivette et al. |
| 6,014,680 | A | 1/2000 | Sato et al. |
| 6,038,561 | A | 3/2000 | Snyder et al. |
| 6,339,767 | B1 | 1/2002 | Rivette et al. |
| 6,442,549 | B1 | 8/2002 | Schneider |
| 6,604,114 | B1 | 8/2003 | Toong et al. |
| 6,694,331 | B2 | 2/2004 | Lee |
| 7,080,067 | B2 | 7/2006 | Nonomura et al. |
| 7,194,691 | B1* | 3/2007 | Zilka et al. ................. 715/739 |
| 2002/0065677 | A1 | 5/2002 | Grainger et al. |
| 2003/0195871 | A1 | 10/2003 | Luo et al. |

(Continued)

OTHER PUBLICATIONS

"U.S. Appl. No. 11/750,620, Pre-Appeal Brief Request filed Sep. 26, 2011", 4 pgs.

(Continued)

*Primary Examiner* — Kevin Nguyen
(74) *Attorney, Agent, or Firm* — Schwegman Lundberg & Woessner, P.A.

(57) ABSTRACT

In an example embodiment, there is a method of maintaining a database of patent claim entries. The patent claim entries are associated with one or more patent documents as well as one or more parameters characterizing a patent claim. The database may be accessed to retrieve a selection of one or more patent claim entries. This may be accomplished by retrieving the one or more parameters associated with the selection of the one or more patent claim entries. Additionally, one or more of the parameters characterizing a patent claims may be selected. A report chart is presented on a display device. The report chart depicts relationships between the selected parameters and the one or more patent claim entries retrieved from the database. The relationships are depicted as a plurality of data points. Also a visualization option may be selected and the report chart may be modified based on the selection. The visualization options may include highlighting related data points, presenting claim language associated with a data point, and presenting more parameters associated with the data point.

14 Claims, 36 Drawing Sheets

(56) References Cited

U.S. PATENT DOCUMENTS

| | | | |
|---|---|---|---|
| 2004/0133566 A1 | 7/2004 | Ishiguro et al. | |
| 2004/0181427 A1 | 9/2004 | Stobbs et al. | |
| 2004/0230550 A1* | 11/2004 | Simpson et al. | 707/1 |
| 2005/0210009 A1 | 9/2005 | Tran | |
| 2007/0288256 A1 | 12/2007 | Speier | |
| 2008/0005103 A1* | 1/2008 | Ratcliffe et al. | 707/5 |
| 2009/0307577 A1* | 12/2009 | Lee | 715/226 |

OTHER PUBLICATIONS

"U.S. Appl. No. 11/759,620 , Appeal Brief filed Feb. 27, 2012", 21 pgs.

"U.S. Appl. No. 11/759,620 Non-Final Office Action mailed Aug. 3, 2010", 13 pgs.

"U.S. Appl. No. 11/759,620, Examiner's Answer mailed Apr. 10, 2012", 12 pgs.

"U.S. Appl. No. 11/759,620, Final Office Action mailed Jan. 26, 2010", 11 pgs.

"U.S. Appl. No. 11/759,620, Final Office Action mailed Apr. 26, 2011", 14 pgs.

"U.S. Appl. No. 11/759,620, Non Final Office Action mailed May 11, 2009", 10 pgs.

"U.S. Appl. No. 11/759,620, Response filed Feb. 3, 2011 to Non Final Office Action mailed Aug. 3, 2010", 9 pgs.

"U.S. Appl. No. 11/759,620, Response filed Jul. 26, 2010 to Final Office Action mailed Jan. 26, 2010", 9 pgs.

"U.S. Appl. No. 11/759,620, Response filed Oct. 13, 2009 to Non Final Office Action mailed May 11, 2009", 11 pgs.

"U.S. Appl. No. 60/703,413, Application Filed Jul. 27, 2000", 56 pgs.

"EAST Text search Training", manual published by USPTO, (Jan. 2000), 1-149.

"Patent Mapping", U.S. Appl. No. 60/703,413, filed Jul. 25, 2005.

\* cited by examiner

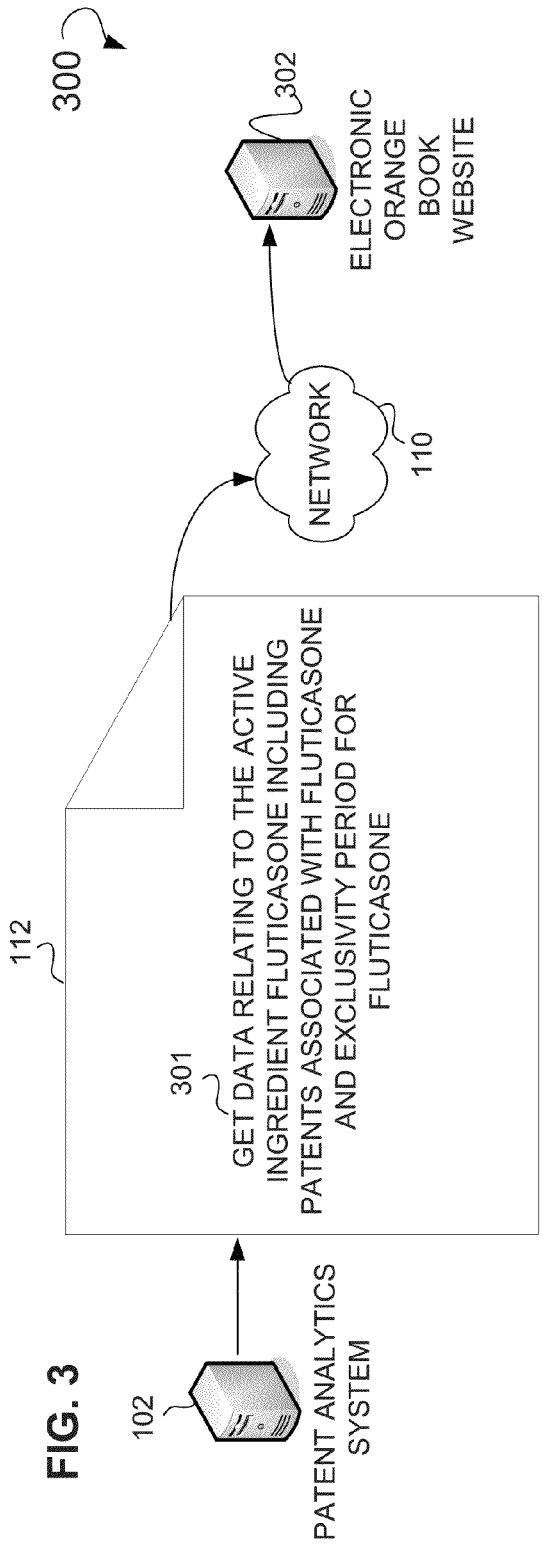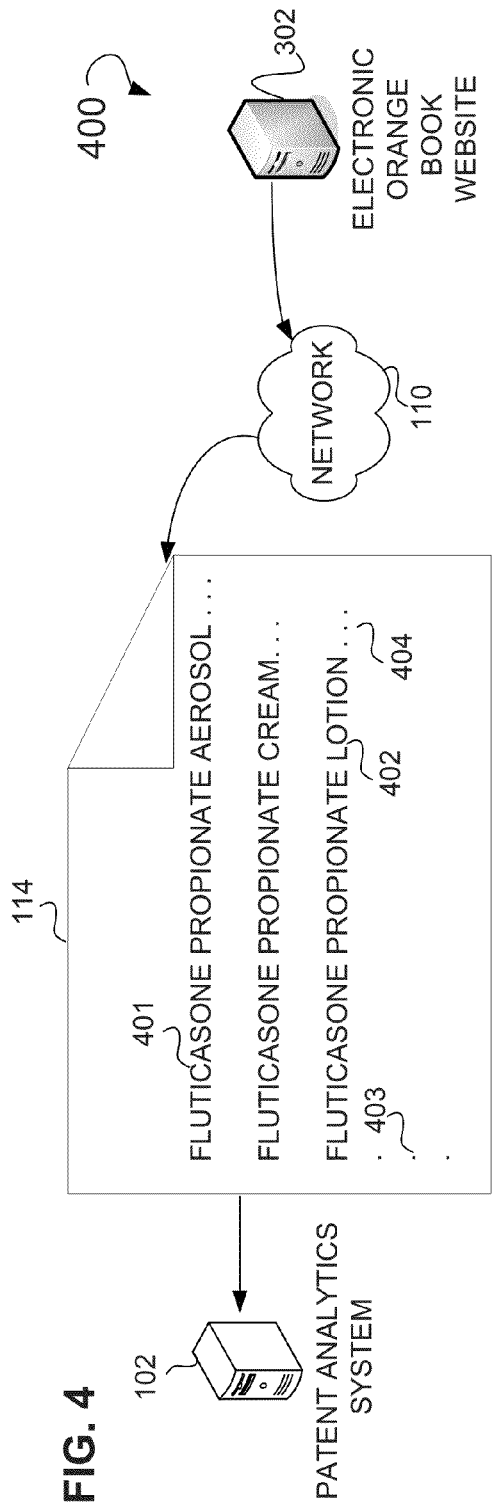

Patent No. 5,070,877   Novel Method of Myocardial Imaging
Mohiuddin, et al.
Issue Date: Nov. 11, 1999

Show claim version:
○ As filed (05-15-1989)
○ As of preliminary amendment (06-15-1989)
○ As of response (02-28-1991)
○ As of response (06-03-1991)
○ As of response (06-11-1991)
○ As of allowance (06-28-1991)
● At issue (11-05-1991)

Show marked up claims: ☐
Show intrinsic reference information: ☑
Show extrinsic reference information: ☑

CLAIMS:                 600A              600C

1. A method of <detecting the presence> and <assessing the severity> of <myocardial dysfunction> in <a human> comp
       600B
(a) <administering> by an <intrave
to <about 200 mcg/kg/minute> of
<coronary artery dilation>; and (b) <performing> a technique on s
severity> of said <myocardial dys 2. A method of <detecting the pre
dysfunction> in <a human> comp (a) <administering> by an <intrac
20 mcg> of an <adenosine recept
dilation>; and (b) <performing> a <technique> o
the severity> of said <myocardial ⊟ Intrinsic Evidence
  ⊞ Prosecution History
  ⊞ Specification
  ⊟ References Listed on Cover Page
    ⊟ U.S. Patent Documents
                3,845,205, Oct. 1974, Maguire et al.   (MSWord) (PDF)
                4,663,313, May 1987, Bristol et al.    (MSWord) (PDF)
      606A      4,673,563, June 1987, Berne et al.     (MSWord) (PDF)
                4,689,041, Aug.1987, Cordy et al.      (MSWord) (PDF)
                4,693,996, Sept. 1987, Steffen         (MSWord) (PDF)
      606B      4,709,703, Dec. 1987, Lazarow et al.   (MSWord) (PDF)
                4,880,783, Nov. 1989, Mentzer et al.   (MSWord) (PDF)
    ⊟ Foreign Patent Documents
                0062921, Oct., 1982, EP                (MSWord) (PDF)
                2007273, Aug., 1971, DE                (MSWord) (PDF)
      606C      WO83/02391, Jul., 1983, WO                     (PDF)
                WO87/01593, Mar., 1987, WO                     (PDF)
    ⊟ Other References
                Camici et al.                          (MSWord)
                Pantely et al.                         (MSWord)
⊟ Extrinsic Evidence
  ⊟ Search Results
    ⊟ U.S. Patents and Applications
                3,845,205, Maguire et al               (MSWord) (PDF)
    ⊞ International Patents and Applications
    ⊞ Non-Patent Literature                            608A   608B
  ⊟ Technical Databases
    ⊞ FDA Drug Approval History
    ⊞ Mosby's Medical Dictionary
    ⊞ Merck Index
    ⊞ Physician's Drug Reference
    ⊞ RXList.com
    ⊞ CHMoogle.com

SEARCH RESULTS FOR "TESTOSTERONE"

1. Patent 4,849,224, "Device for administering an active agent to the skin or mucosa"
   ... steroids such as estradiol, progesterone, norgestrel, levonorgestrel, norethindrone, medroxyprogestrone acetate, testosterone and their esters, nitro-compounds ... (Detailed Description) [Found in Orange Book]

2. Patent 4,855,294, "Method for reducing skin irritation associated with drug/penetration enhancer compositions"
   Found in Orange Book (p. 978, product number 020489 001)

3. Patent 4,863,970, "Penetration enhancement with binary system of oleic acid, oleins, and oleyl alcohol with lower alcohols"
   Typical male sex hormones which may be utilized may be represented by, without limitation, testosterone, methyltestosterone, and fluoxymesterone. (Detailed Description) [Found in Orange Book]

4. Patent 4,983,395, "Device for administering an active agent to the skin or mucosa"
   ... steroids such as estradiol, progesterone, norgestrel, levonorgestrel, norethindrone, medroxyprogestrone acetate, testosterone and their esters, nitro-compounds ... (Detailed Description) [Found in Orange Book]

802

5. Patent 5,152,997, "Method and device for transdermally administering testosterone across nonscrotal skin at therapeutically effective levels"
   Testosterone is administered transdermally through nonscrotal skin ... (Abstract)

| Expiration Date: 12/11/2010 |
   | Assignee: Theratech, Inc. |
   | Inventor(s): Ebert, Charles D.; Patel, Dinesh; Heiber, Werner |

804

6. Patent 7,087,240, "Device and method for the treatment of erectile
   12. The delivery device of claim 8, wherein the therapeutic agent is selected from the group consisting of prostaglandin, a testosterone, a yohimbine ... (Claims) [Found in Related Patents of Patent 5,152,997]

7. Korenman et al., "Androgen Therapy of Hypogonadal Men with Transscrotal Testosterone Systems"
   ... select scrotal skin--which is highly permeable to testosterone--as a site for testosterone delivery ... (Am. J. Med. (1987) 83:471-478) [Found in Other References of Patent 5,152,997]

☐ Active Pharmaceutical Ingredient (chemical name)
☑ Proprietary Name (trademarked name)
☐ Chemical Structure (e.g., ChemDraw)
☑ Molecular Formula
☐ API Clinical Pharmacology
☐ Names of all commercially (brand/proprietary) marketed formulations having active ingredient
☐ Indication of Use (broad, specific and labeled use)
☐ Formulation (active and inactive ingredients), including amounts, concentrations, pH, etc.
☑ Sales of Drug ($USD per year)
☐ Type of formulation (e.g., gel, lotion, ointment, etc.)
☐ Route of administration (e.g., topical, oral, IV, IP, rectal, buccal, vaginal, occular, etc.)
☐ *Dosage(s)*
☐ Marketing Company (NDA/ANDA Holder)
☐ Competing drug(s) (for same approved indication of use)
☐ Application Number (FDA)
☐ FDA Drug approval History (pdf)
☐ Possible third party ANDA Filer(s)
☐ Patent (pdf)
    ☐ File Wrapper for each patent above (pdf)
    ☐ Patent Applicant Holder (Assignee or Licensee)
    ☐ Reference(s) in intrinsic record (pdf)
    ☐ "Children/progeny" of the above issued patent(s) (pdf)
    ☐ "Parents" of the above issued patent(s) (pdf)
    ☑ "Patent family tree" of the above issued patent(s)
        ☐ Corresponding foreign patent(s) (pdf)
        ☐ File wrapper, e.g., opposition proceedings, of foreign patent(s) (pdf)
    ☐ Assignment of the above issued patent(s)
    ☐ "Small/large entity" status, and all small/large entity payments
    ☐ Maintenance fee payments
    ☐ Prior art (anticipatory/obviousness) claim chart (spreadsheet)
    ☐ Freedom-to-operate (non-)infringement) claim chart (spreadsheet)
    ☐ Small/Large entity status
    ☐ Maintenance fee payments
    ☐ Patent term extension(s)
    ☐ FDA Periods of exclusivity
    ☐ Disclaimed claims(s) per official Gazette (OG)
        ☐ Copy of relevant OG (pdf)
    ☐ Claim(s) held invalid per Federal Circuit
        ☐ Copy of Fed. Cir. decision (pdf)
    ☐ Clean copy of issued claims (pdf)
        ☐ Intrinsic support for each claim limitation (pdf)
        ☐ Extrinsic support for each claim limitation (pdf)
    ☐ Marked-up copy of issued claims (pdf)
        ☐ Intrinsic support for each claim limitation (pdf)
        ☐ Extrinsic support for each claim limitation (pdf)
    ☐ Claim "tree" showing listing of each claim during prosecution (pdf)

1006 — (pointing to Dosage(s))
1002 — (bracket for checklist)

( RUN REPORT ) — 1004

FIG. 13

Patent No. X,XXX,XXX
Inventor, et al.          } 1302
Issue Date: Nov. 11, 1999

CLAIM 1 : A METHOD OF . . . ~1304

PLEASE PROVIDE RANKING DETAILS FOR THE ABOVE PATENT CLAIM

CLAIM SCOPE: ~1306
  ○ NARROW    ○ INTERMEDIATE    ● BROAD
  REASON? [                              ]

CLAIM TYPE: ~1308
  ● METHOD    ○ COMPOUND    ○ PRODUCT BY PROCESS
  REASON? [                              ]

CLAIM CATEGORY: ~1310
  ● CORE    ○ ANCILLARY    ○ EVERGREEN
  REASON? [                              ]

LISTABLE IN ORANGE BOOK? ~1312
  ☐ NO    ☑ YES    REASON? [                    ]

COVERS A COMMERCIAL PRODUCT? ~1314
  ☑ NO    ☐ YES    PRODUCT [                    ]

( SUBMIT )    ( NEXT CLAIM )    ( CANCEL )
   1316           1318              1320

1300

| SEARCH CRITERIA | | |
|---|---|---|
| PATENT # [ ] DRUG [ ] API [FENOFIBRATE] | | |
| DISPLAY ○ PATENT CENTRIC  ○ DRUG PRODUCT CENTRIC  ● API CENTRIC | | (SEARCH) |

| API NAME | PROPRIETARY NAME | PATENT # |
|---|---|---|
| FENOFIBRATE | TRICOR | 4,800,079 |
| | TRICOR | 6,277,405 |
| | ANTARA (MICRONIZED) | 5545628 |
| | TRICOR (MICRONIZED) | 6,652,881 |
| | LIPOFEN | 4,895,726 |
| | FENOFIBRATE | 6,096,084 |
| | LIPIDIL | 7,101,574 |
| | FENOGLIDE | 7,320,802 |
| | FENOFIBRATE (MICRONIZED) | 7,037,529 |
| | TRIGLIDE | 6,375,986 |
| | | 7,041,319 |
| | | 7,276,249 |
| | | 6,074,670 |
| | | 6,589,552 |
| | | 5,145,684 |

Fig. 14

| | | SEARCH CRITERIA | | |
|---|---|---|---|---|
| PATENT # [ ] | DRUG [ ] | API [FENOFIBRATE] | | |
| DISPLAY ○ PATENT CENTRIC | ● DRUG PRODUCT CENTRIC | ○ API CENTRIC | | [SEARCH] |

| PROPRIETARY NAME | API NAME | PATENT # |
|---|---|---|
| ANTARA (MICRONIZED) | FENOFIBRATE | 4,800,079 |
| | | 7,101,574 |
| FENOFIBRATE | FENOFIBRATE | |
| FENOFIBRATE (MICRONIZED) | FENOFIBRATE | |
| FENOGLIDE | FENOFIBRATE | |
| LIPIDIL | FENOFIBRATE | |
| LIPOFEN | FENOFIBRATE | 5,545,628 |
| TRICOR | FENOFIBRATE | 6,375,986 |
| | | 7,041,319 |
| | | 7,276,249 |
| | | 6,277,405 |
| | | 6,652,881 |
| | | 4,895,726 |
| | | 6,589,552 |
| | | 6,074,670 |
| | | 5,145,684 |
| | | 7,320,802 |
| | | 7,037,529 |

Fig. 15

| | | | | | | | | SEARCH CRITERIA | | | | | | | | | | | | | | | | | |
|---|---|---|---|---|---|---|---|---|---|---|---|---|---|---|---|---|---|---|---|---|---|---|---|---|---|
| PATENT # | | | DRUG | | | | | | | API | FENOFIBRATE | | | | | | | | | | | | | | |
| DISPLAY | ● PATENT CENTRIC | | | ○ DRUG PRODUCT CENTRIC | | | | ○ API CENTRIC | | | | | | | | | | | | SEARCH | | | | | |
| A | B | C | D | E | F | G | H | I | J | K | L | M | N | O | P | Q | R | S | T | U | V | W | X | Y | Z |
| PATENT # | | | | PROPRIETARY NAME | | | | | | | | | | | | | | | API NAME | | | | | | |
| 4,800,079 | | | ANTARA (MICRONIZED) | | | | | | | | | | | | FENOFIBRATE | | | | | | | | | | |
| 4,895,726 | | | TRICOR<br>TRICOR (MICRONIZED) | | | | | | | | | | | | FENOFIBRATE | | | | | | | | | | |
| 5,145,684 | | | TRICOR | | | | | | | | | | | | FENOFIBRATE | | | | | | | | | | |
| 5545628 | | | LIPOFEN | | | | | | | | | | | | FENOFIBRATE | | | | | | | | | | |
| 6,074,670 | | | TRICOR | | | | | | | | | | | | FENOFIBRATE | | | | | | | | | | |
| 6,277,405 | | | TRICOR | | | | | | | | | | | | FENOFIBRATE | | | | | | | | | | |
| 6,375,986 | | | TRICOR | | | | | | | | | | | | FENOFIBRATE | | | | | | | | | | |
| 6,589,552 | | | TRICOR | | | | | | | | | | | | FENOFIBRATE | | | | | | | | | | |
| 6,652,881 | | | TRICOR | | | | | | | | | | | | | | | | | | | | | | |

Fig.16

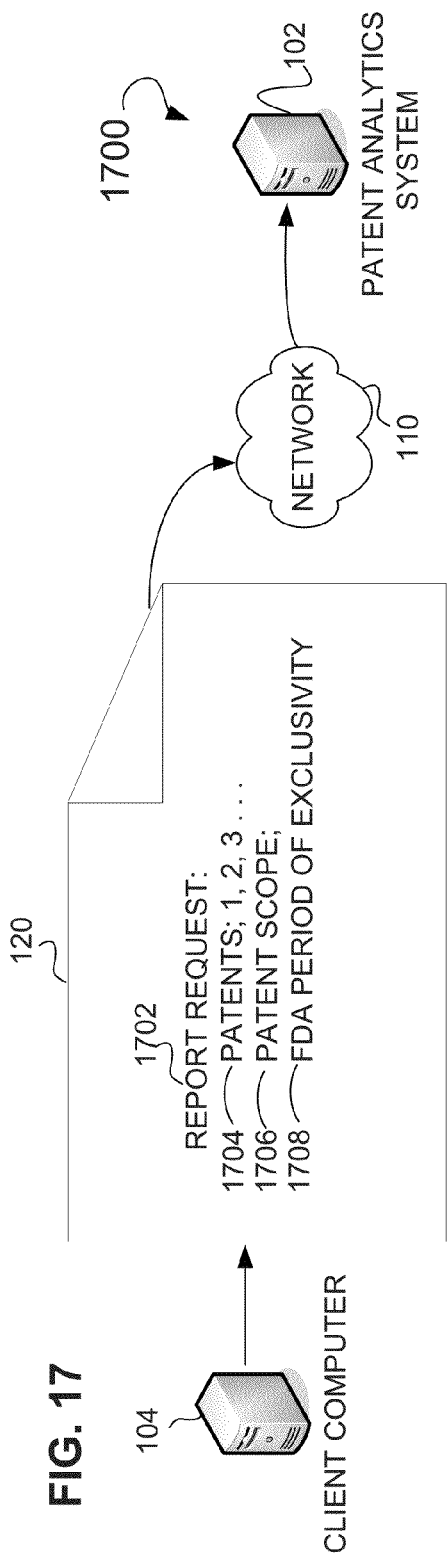
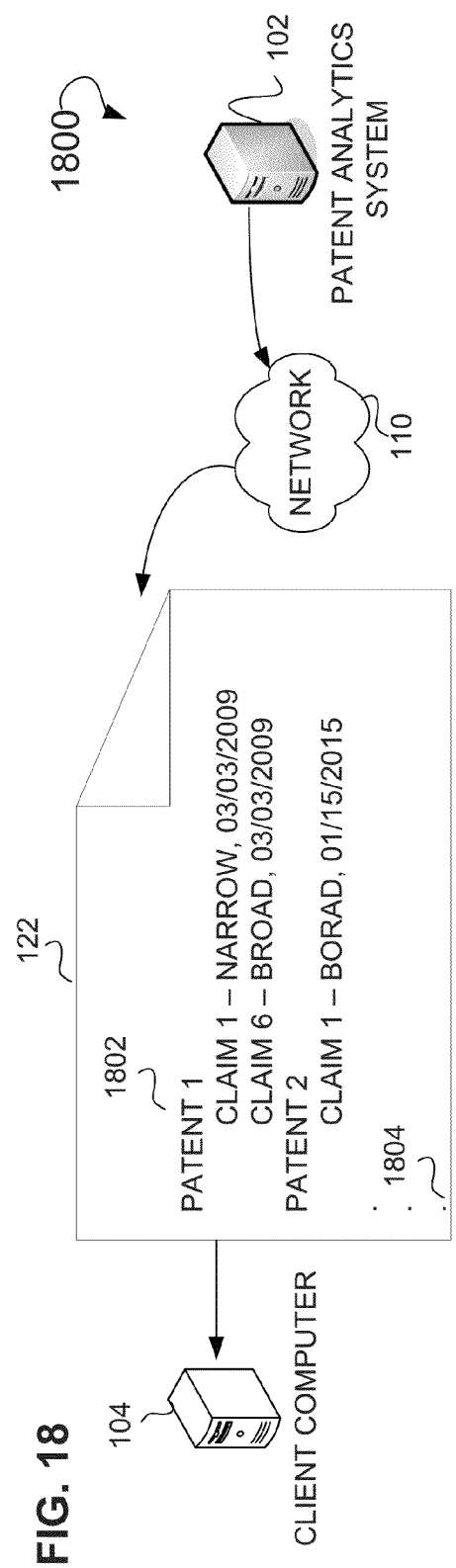

FIG. 19                                        1900

```
┌─────────────────────────────────────────────────────────────────┐
│                                                                 │
│  CHECK THE BOXES NEXT TO THE PATENTS YOU WOULD LIKE             │
│  INCLUDED IN THE REPORT                                         │
│                                                                 │
│          PATENT 1 ✓    PATENT 2 ✓    PATENT 3 ☐    PATENT 4 ✓   ⎫
│                                                                 ⎬ 1902
│          PATENT 5 ☐    PATENT 6 ☐    PATENT 7 ✓                 ⎭
│                                                                 │
├─────────────────────────────────────────────────────────────────┤
│  CHOOSE THE PARAMETERS TO INCLUDE IN THE REPORT                 │
│                     ⌒1906                      1906⌒            │
│           AXIS : X  Y                 AXIS : X  Y               │
│      CLAIM SCOPE  ☐  ☐      PATENT TERM EXPIRATION ☐  ☐         │
│    CLAIM CATEGORY ☐  ☐      FDA EXCLUSIVITY EXPIRATION ☐  ☐   ⎬ 1904
│ 1908 ⌒ CLAIM TYPE ✓  ☐      READS ON COMMERCIAL PRODUCT ☐  ✓    │
│     TOTAL REVENUE ☐  ☐        LISTABLE IN ORANGE BOOK  ☐  ☐     │
│                            1910                                 │
│                                                                 │
│                      ┌───────────┐                              │
│                      │ GENERATE  │ ─ 1912                       │
│                      │  REPORT   │                              │
│                      └───────────┘                              │
└─────────────────────────────────────────────────────────────────┘
```

FIG. 31

For LIPITOR® (atorvastatin calcium) Tablets, And All Patents Listed in Orange Book Claim Type vs. FDA Periods of Exclusivity

| | July 30, 2007 | Sept. 21, 2008 | March 2, 2010 |
|---|---|---|---|
| Compound | 4,681,893 - 1<br>5,273,995 - 1<br>5,969,156* | 4,681,893 - 1<br>5,273,995 - 1<br>5,969,156* | 4,681,893 - 1<br>5,273,995 - 1<br>5,969,156* |
| Composition | 4,681,893 - 8<br>5,686,104 - 1, 14, 21<br>5,273,995 - 11<br>6,126,971 - 1, 8, 17 | 4,681,893 - 8<br>5,686,104 - 1, 14, 21<br>5,273,995 - 11<br>6,126,971 - 1, 8, 17 | 4,681,893 - 8<br>5,686,104 - 1, 14, 21<br>5,273,995 - 11<br>6,126,971 - 1, 8, 17 |
| Method of Medical Use | 4,681,893 - 3<br>5,686,104 - 22<br>5,273,995 - 12<br>6,126,971 - 4 | 4,681,893 - 3<br>5,686,104 - 22<br>5,273,995 - 12<br>6,126,971 - 4 | 4,681,893 - 3<br>5,686,104 - 22<br>5,273,995 - 12<br>6,126,971 - 4 |
| Processing | 5,686,104 - 6, 15<br>6,126,971 - 7, 13 | 5,686,104 - 6, 15<br>6,126,971 - 7, 13 | 5,686,104 - 6, 15<br>6,126,971 - 7, 13 |
| Product-By-Process | 6,126,971 - 16 | 6,126,971 - 16 | 6,126,971 - 16 |

*Claims 1-5, 9, 28-29, 31, 36, 38, 45, 46, 47-69, 100-110, 113-117

FIG. 33

For LIPITOR® (atorvastatin calcium) Tablets, And All Patents Listed in Orange Book Claim Breadth vs. USPTO Expiration Dates and FDA Periods of Exclusivity

| | 2007 | 2008 | 2009 | 2010 | 2011 | 2012 | 2013 | 2014 | 2015 | 2016 | 2017 |
|---|---|---|---|---|---|---|---|---|---|---|---|
| Broad | 4,681,893 – 1, 8, 9 | 4,681,893 – 1, 8, 9 | | 4,681,893 – 1, 8, 9 | | | | | | | |
| Broad-Intermediate | 6,126,971 – 1, 8, 17 | 6,126,971 – 1, 8, 17 | | 6,126,971 – 1, 8, 17 | | | 6,126,971 – 1, 8, 17 | | 5,686,104 – 6 | | |
| Intermediate | 5,686,104 – 6 | 5,686,104 – 6 | | 5,686,104 – 6 | | | | | | | |
| | 6,126,971 – 4 | 6,126,971 – 4 | | 6,126,971 – 4 | | | 6,126,971 – 4 | | | | |
| Intermediate-Narrow | 6,126,971 – 7, 13 | 6,126,971 – 7, 13 | | 6,126,971 – 7, 13 | | | 6,126,971 – 7, 13 | | | | |
| Narrow | 5,273,995 – 1, 11, 12 | 5,273,995 – 1, 11, 12 | | 5,273,995 – 1, 11, 12 | 5,273,995 – 1, 11, 12 | | | | | | |
| | 6,126,971 – 16 | 6,126,971 – 16 | | 6,126,971 – 16 | | | 6,126,971 – 16 | | | | |
| | 5,686,104 – 1, 14-15, 21-22 | 5,686,104 – 1, 14-15, 21-22 | | 5,686,104 – 1, 14-15, 21-22 | | | | | 5,686,104 – 1, 14-15, 21-22 | | |
| | | | | | | | | | | | 5,969,156 |
| USPTO | 10/30/07 | | | | | | | | | | |
| FDA | | 9/21/08 | | 3/2/10 | | | | | | | |

*Claims 1-5, 9, 28-29, 31, 36, 38, 45, 46, 47-69, 100-110, 113-117

Fig. 34

FOR LIPITOR (ATORVASTATIN CALCIUM) TABLETS, AND ALL PATENTS LISTED IN THE ORANGE BOOK
CLAIM TYPE VS. USPTO EXPIRATION DATES AND FDA PERIODS OF EXCLUSIVITY

| | 2007 | 2008 | '09 | 2010 | 2011 | '12 | 2013 | '14 | 2015 | '16 | 2017 |
|---|---|---|---|---|---|---|---|---|---|---|---|
| COMPOUND | 4,681,893 – 1 ◇<br>5,273,995 – 1 □<br>5,969,156* ○ | 4,681,893 – 1 ◇<br>5,273,995 – 1 □<br>5,969,156* ○ | | 4,681,893 – 1 ◇<br>5,273,995 – 1 □<br>5,969,156* ○ | 5,273,995 – 1 □ | | | | | | 5,969,156* ○ |
| COMPOSITION | 4,681,893 – 8 ◇<br>5,686,104 – 1, 14, 21 ❖<br>5,273,995 – 11 □<br>6,126,971 – 1, 8, 17 ✿ | 4,681,893 – 8 ◇<br>5,686,104 – 1, 14, 21 ❖<br>5,273,995 – 11 □<br>6,126,971 – 1, 8, 17 ✿ | | 4,681,893 – 8 ◇<br>5,686,104 – 1, 14, 21 ❖<br>5,273,995 – 11 □<br>6,126,971 – 1, 8, 17 ✿ | 5,273,995 – 11 □ | | 6,126,971 – 1, 8, 17 ✿ | | 5,686,104 – 1, 14, 21 ❖ | | |
| METHOD OF MEDICAL USE | 4,681,893 – 3 ◇<br>5,686,104 – 22 ❖<br>5,273,995 – 12 □<br>6,126,971 – 4 ✿ | 4,681,893 – 3 ◇<br>5,686,104 – 22 ❖<br>5,273,995 – 12 □<br>6,126,971 – 4 ✿ | | 4,681,893 – 3 ◇<br>5,686,104 – 22 ❖<br>5,273,995 – 12 □<br>6,126,971 – 4 ✿ | 5,273,995 – 12 □ | | 6,126,971 – 4 ✿ | | 5,686,104 – 22 ❖ | | |
| PROCESSING | 5,686,104 – 6, 15 ❖<br>6,126,971 – 7, 13 ✿ | 5,686,104 – 6, 15 ❖<br>6,126,971 – 7, 13 ✿ | | 5,686,104 – 6, 15 ❖<br>6,126,971 – 7, 13 ✿ | | | 6,126,971 – 7, 13 ✿ | | 5,686,104 – 5, 15 ❖ | | |
| PRODUCT-BY-PROCESS | 6,126,971 – 16 ✿ | 6,126,971 – 16 ✿ | | 6,126,971 – 16 ✿ | | | 6,126,971 – 16 ✿ | | | | |
| USPTO<br>FDA | 10/30/07 | 9/21/08 | | 3/2/10<br>2010 | | | | | | | |

CLAIMS 1-5, 9, 28-29, 31, 36, 38, 45, 46, 47-69, 100-110, 113-117

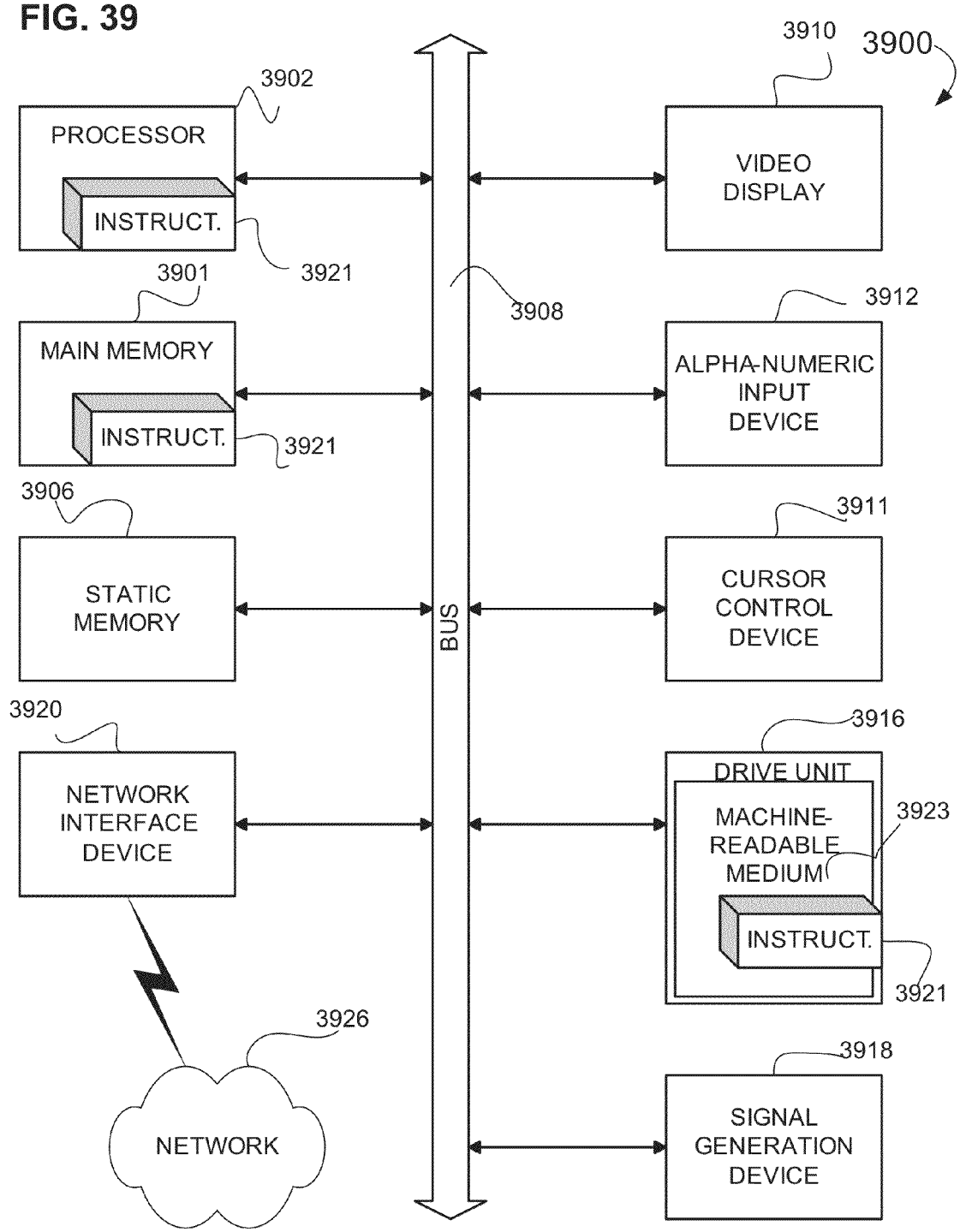

PATENT ANALYTICS SYSTEM

CLAIM OF PRIORITY

This patent application claims the benefit of priority, under 35 U.S.C. Section 119(e), to U.S. Provisional Patent Application Ser. No. 61/113,114, entitled "PATENT DATABASE AND ANALYTICS ENGINE," filed on Nov. 10, 2008 which is hereby incorporated by reference. This patent application also claims priority, under 35 U.S.C. Section 119(e), to U.S. Provisional Patent Application Ser. No. 61/115,284, entitled "PATENT CLAIM REFERENCE GENERATION," filed on Nov. 17, 2008 which is hereby incorporated by reference.

TECHNICAL FIELD

This patent document relates generally to patent claim information as implemented in software, and more specifically, but not by way of limitation, to a patent claim reference and analytics system.

BACKGROUND

The value of a patent and the technology disclosed therein, to some extent, hinges on the ability to identify patents, printed publications, and other data within the same technology space as the patented technology. Once identified, the relative strength of the patent and its claims may be determined.

BRIEF DESCRIPTION OF THE DRAWINGS

Some embodiments are illustrated by way of example and not limitation in the figures of the accompanying drawings in which:

FIG. 3 is a schematic of a system diagram illustrating a data request, according to an example embodiment;

FIG. 4 is a schematic of a system diagram illustrating the providing of drug data, according to an example embodiment;

FIG. 6 illustrates some embodiments of a user interface to display claims and relevant references associated with claim limitations within each claim, according to an example embodiment;

FIG. 8 illustrates a search results screen, according to an example embodiment.

FIG. 10 illustrates a report generation screen, according to an example embodiment;

FIG. 13 illustrates an example user interface to rank a patent claim according to a plurality of parameters, according to an example embodiment;

FIGS. 14-16 illustrates example user interfaces for viewing and searching a patent database, according to example embodiments;

FIG. 17 is a schematic of a system diagram illustrating a report request, according to an example embodiment;

FIG. 18 is a schematic of a system diagram illustrating the providing of report data, according to an example embodiment;

FIG. 19 illustrates an example user interface to generate a report request according to a plurality of parameters, according to an example embodiment;

FIGS. 22-36 illustrate example reports according to example embodiments.

FIG. 39 illustrates a computer system, according to an example embodiment.

DETAILED DESCRIPTION

Figure 1:
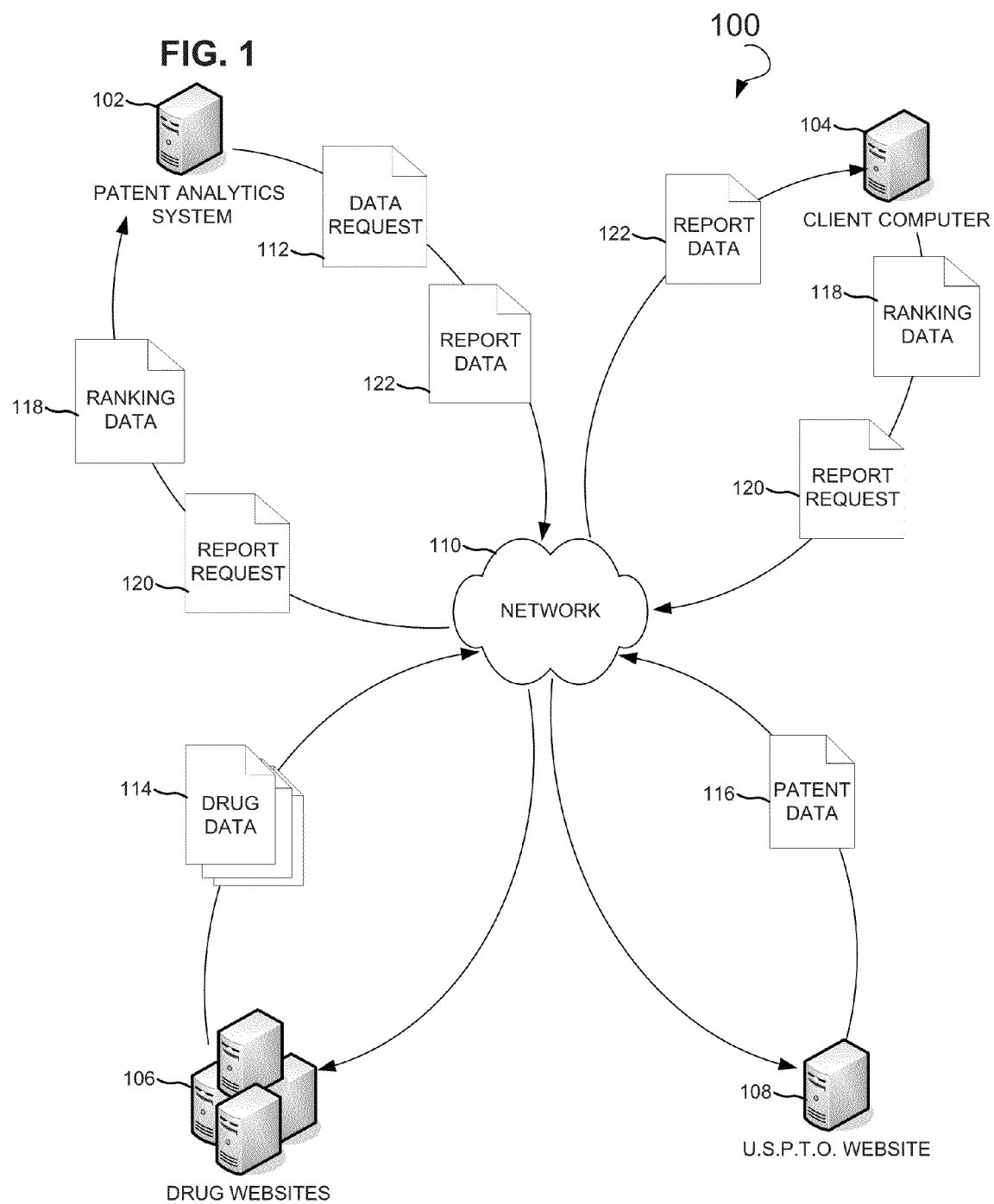
FIG. 1 is a network diagram illustrating a system used to obtain information regarding chemical compounds, generate reports, and gather patent ranking data, according to an example embodiment.

The following detailed description includes references to the accompanying drawings, which form a part of the detailed description. The drawings show, by way of illustration, specific embodiments in which the invention may be practiced. These embodiments, which are also referred to herein as "examples," are illustrated in enough detail to enable those skilled in the art to practice the invention. The embodiments may be combined, other embodiments may be utilized, or structural, logical, and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Various embodiments illustrated herein provide computerized patent analytics systems, methods, data structures, and encoded instructions. Some such embodiments provide methods of storing patent reference data, subjective patent data, methods of presenting patent reference data, methods of presenting subjective patent data, and method of presenting a combination of the subjective and reference data.

Pharmaceutical companies, like many companies, need to make determinations of where best to spend their resources. In particular, there is particular value in being the first company to genericize a commercial drug as there exists a 180-day period of exclusivity for the first company to file under the Abbreviated New Drug Application (ANDA) process. The process for filing for filing an ANDA may involve the financial, technical, regulatory, and legal departments of a company. The business department may need to identify those drugs that represent significant revenue potential (e.g., those that satisfy suitable sales and market share). The technical department may possess the technical capabilities to develop the generic drug, including the Active Pharmaceutical Ingredient (API). The regulatory department may need to demonstrate bioequivalence. Finally, the legal department may need to show non-infringement or invalidity of existing patents.

There may be many challenges and obstacles that need to be overcome in order to successively bring a generic drug to market. For example, the business development group (BDG) may to need to consider past and future sales and past and future market share to determine if it is financially worthwhile to move into a particular market. The BDG may also wish to know which drugs have been already genericized and the sales of those drugs. For example, it may still be useful to genericize a commercial drug if there is a low number of a generic drugs relative to the total market share for the commercial drug.

The legal department may need to decide whether to certify under paragraph III or paragraph IV. Also, the breadth of patent protection may vary depending on the patent specification and claims of the patent. Subjective determinations of a patent may be made to determine the value of the patent to a given company. For example, an analysis of a patent may include determining whether each patent claim is broad, narrow, or somewhere in between. This information may help to determine whether or not the breadth of patent protection makes it feasible to genericize a particular drug. Other important information may include when relevant patents expire, as well as the Food and Drug Administration (FDA) periods of exclusivity. In some instances, a company may seek an opinion letter from a law firm to determine non-infringement or invalidity positions. However, opinions may expensive and time consuming to obtain. The legal department may also be used to conduct a freedom-to-operate (FTO) clearance review for non-Orange Book (e.g., "process" or third-party) patents.

In an example embodiment, methods and systems are developed to help streamline the ANDA process. The systems and methods may also be used in other aspects of business or patent analysis, as one skilled in the art will appreciate. In an example embodiment, a web-based solution is developed to help senior management, business development personnel, financial personnel, in-house counsel, opinion counsel, litigation counsel, and licensing and transactional counsel with the ANDA process. In an example embodiment there are three main components used to facilitate this process: database creation through the gathering of patent and drug reference information, analytics, and report/chart generation based on merging information in the database with the applied analytics. Each main component may include one or more additional components as described below.

In an example embodiment, at a high level, the database creation component may include an automated process of gathering objective patent reference information into a database that may include, but is not limited to, claim language, patent expiration data, intrinsic evidence, and extrinsic evidence associated with the patent. It may further include gathering information from regulatory, legal, technical, and financial sources including, but not limited to, the Orange Book, United States Patent and Trademark Office (USPTO) Orange Book patents, Drug Information, and SEC filings. A user of the resulting database may search and filter results to quickly find information related to any number of drugs and see patents associated with the drug. Reports may be generated from the database that take the raw data and present it in a form that non-legal and non-technical personnel can utilize.

For example, business personnel may inquire as to the number of patents related to drug X and the expiration dates of the patents. As the database may be constantly updated in real-time, the report may also include the most up-to-date information.

In an example embodiment, the analytics component may include ranking and rating patent claims by applying subjective criteria to the gathered patents. The subjective criteria may include, but is not limited to, if a claim is listable in the Orange Book, the breadth of claims in patents, whether or not a claim covers a commercial product, the type of claim, and claim category. Determining whether or not a drug is listable in Orange Book may include information relating to "off label" use, metabolite, pro-drug, processing claims, key synthetic intermediates, etc. The claim breadth or scope may be based on criteria such ease of design-around ability and anticipated validity. There may also be a subjective analysis of a patent claim to determine whether a claim has been drafted narrowly or broadly. Claim types may include, but are not limited to, compound, method of use, polymorph, hydrate, and method of medical use. Claim categories may include, but are not limited to core, ancillary, and evergreen. In an example embodiment, a legend or key is provided that defines each term used in the subjective criteria as well as why a patent was given a particular rating.

In an example embodiment, once the database has been populated with reference information, and the claims have been analyzed using the various subjective criteria, charts may be generated by using one or both of the resulting data sets. This may be done by displaying objective data from the database against subjective criteria from the analytics component together on a chart. For example, a user of the system may search the database to find all patents related to a drug such as Crestor®. The user may further wish to see the expiration dates of all patents related to Crestor® against the breadth of their claims. In this manner non-technical personnel can quickly see what patents either need to be licensed or designed around in order to bring a generic drug to market. If a business knows it is not planning on launching the new drug for three years, a user can look at the chart and quickly determine which patents may safely be ignored. Other combinations of the objective data and subjective criteria are explored more fully below.

FIG. 1 illustrates a network diagram illustrating an example system 100 used to obtain information regarding chemical compounds, generate reports, and gather patent ranking data. Illustrated is a patent analytics system 102 operatively coupled to the network 110. In some embodiments, this network 110 is a Local Area Network (LAN), a Wide Area Network (WAN) or a network of networks such as the Internet. Also illustrated are a number of Websites 106. These website may include an Rxlist Website, a Food and Drug Administration Website, an Electronic Orange Book Website, and a Pub Chem Website. Collectively, these Websites may be thought of as regulatory drug Websites (e.g., operated by a government, regulatory agency) having associated regulatory databases. Also, illustrated is the United States Patent and Trademark Office (USPTO) website. Each of these Websites is operatively coupled to the network 110 and ultimately the patent analytics system 102. Supporting each of these Websites is a Web server, application server, and database server (not pictured). Further illustrated is a client computer 104. This client computer 104 may communicate with the Website 106, 108 and the patent analytics system 102 through the network 110. The client computer may be a traditional personal computer, but may also include devices such as personal digital assistants (PDA) and mobile phones.

In some embodiments, a data request (e.g., a search query) 112 is made by the patent analytics system 102 seeking data relating to chemical molecules, compounds or other patentable subject matter. As may be more fully illustrated below, this data request may take the form of the execution of a Web crawler or other application designed to elicit information from, for example Web pages or other sources of data available on the network 110. In some cases, direct queries may be made of a specific drug website (e.g., the Orange Book Website). Once a data request 112 is made, then drug data 114 may be returned from each of the Websites in response to the query. In some cases, the drug data 114 (e.g., retrieved data or data) may be pulled from the Website by, for example, a Web crawling application, while in other cases it may be pushed by the Website in response to a direct query by the patent analytics system 102. Similarly, the data request 112 may formatted to request patent data 116 from the USPTO website 108. This patent data may include, but is not limited to, prosecution history, patent claims, patent claim revisions, and patent reference data (e.g. filing date, expiration date, etc.). Further, this drug and patent data may be in the form of, for example, a Hyper Text Markup Language (HTML) based web page, a Portable Document Format (.pdf) formatted file, or some other suitable file (e.g., .tiff, .png, .gif. etc.). As will be more fully illustrated below, upon retrieval, this drug and patent data may be parsed based upon claim language, limitations, and stored for future use.

In some example embodiments, ranking data 118 is transmitted from the client computer 104 to the patent analytics system 102. As explained above, this ranking data may include data associated with the scope, type, and category or patent claims stored in the patent analytics system 102. Further illustrated is a report request 120 that is communicated to the patent analytics system 102 via the network 110. An example report request 120 may include a request for information stored in the patent analytics system 102 such as ranking data, drug data, patent data, or any combination thereof. In response to a report quest 120, the patent analytics system may retrieve the requested data, transform it into a graphic representation, and transmit it as report data 122 to the client computer 122 where it may be presented on a display device.

In some embodiments, Website and associated data stores relating to arts other than the chemical and biological arts may be accessed for the purpose of obtaining information relating to a patent. For example, when obtaining information relating to the patent in the electrical or software arts, web site Web sites run by organizations such as the Institute of Electrical and Electronics Engineers (IEEE) or the Association for Computing Machinery (ACM) may be accessed for the purpose of obtaining extrinsic evidence. The use of Website and data sources related to the chemical and biotechnology arts is merely for illustrative purposes and is not meant to limit the scope of the system and method illustrated herein.

Figure 2:
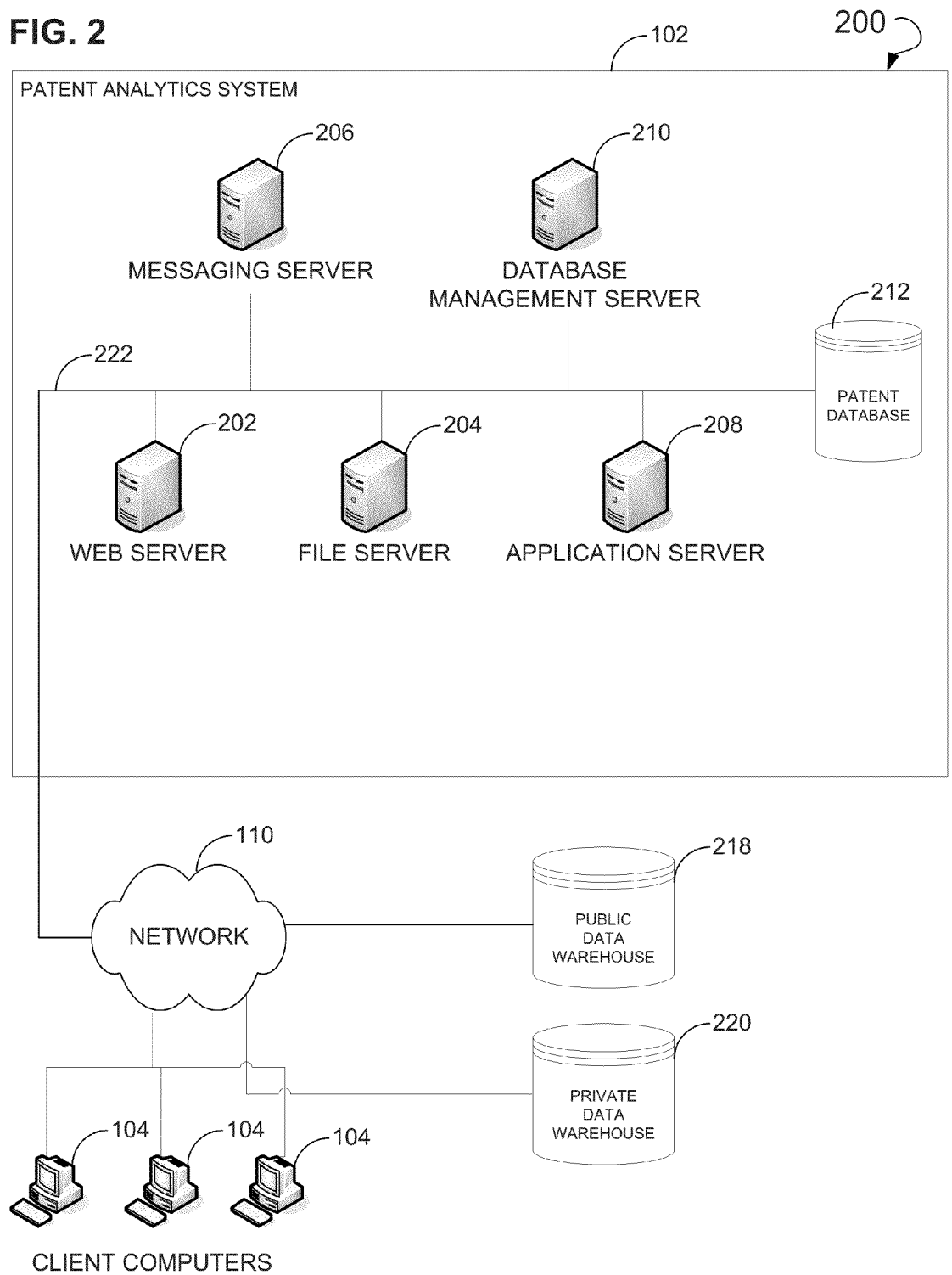
FIG. 2 is a schematic of a patent analytics system capable of collecting, organizing, and managing patent data, according to an example embodiment.

FIG. 2 is a schematic view of a patent analytics system 102 capable of collecting, organizing, and managing patent references, subjective and objective patenting data, and generating reports based, in part, on the patent references and the subjective and objective patent data. In some embodiments, the patent analytics system 102 includes a Web server 202, a file server 204, a messaging server 206, an application server 208, a database management server 210, and a patent database 212, all communicatively coupled via a network connection 222. Servers 202, 204, 206, 208, 210 may include software management programs, hardware devices, or combinations of software and hardware. In addition, one or more servers 202, 204, 206, 208, 210 may be implemented on a shared device or in a shared program. These software management programs may be implemented as various software operations (see description of software operations outlined below). Network connection 222 may connect to a single LAN or WAN, or combinations of LANs or WANs, such as the Internet. Network connection 222 may be implemented using wired or wireless connections.

One or more client computers 104 may be communicatively coupled to the patent analytics system 102 via a network 110. The network 110 may include a single LAN or WAN, or combinations of LANs or WANs, such as the Internet. The various devices coupled to the network 110 may be coupled to the network 110 via one or more wired or wireless connections. One or more public data warehouses 218 and one or more private data warehouses 220 may also be communicatively coupled to the patent analytics system 102 via the network 110.

The Web server 202 may communicate with the file server 204 to publish or serve files stored on the file server 204. The Web server 202 may also communicate or interface with the application server 208 to enable Web-based presentation of patent-related information. For example, the application server 208 may consist of scripts, applications, or library files that provide primary or auxiliary functionality to the Web server 202 (e.g., multimedia, file transfer, or dynamic interface functions). In addition, the application server 208 may also provide some or an entire interface for the Web server 202 to communicate with one or more of the other servers in the patent analytics system 102, e.g., the messaging server 206 or the database management server 210.

The application server 208 may also contain one or more software programs capable of searching, collecting, or organizing references from disparate sources. One example of such a program includes a Web crawler, also known as a Web spider or robot. Web crawlers include programs that are specifically designed to browse the World Wide Web in an automated, methodical manner. Some Web crawlers are programmable, such as being able to filter on a particular subject matter area or restrict crawling to a particular group of Web sites. Another example of a software program that may be hosted on the application server 208 for such an operation includes a script or a dedicated program to periodically or regularly search one or more specific Web sites. Such a script or dedicated program may be available from a content provider. For example, a content provider may grant licenses to proprietary content for a fee. As a provision of the license, the licensee may be given a program, such as a client program, to access the proprietary content. The client program may be configurable to automatically search or retrieve data from the content provider's data store and save resulting data, such as to the patent database 212.

In some embodiments, this Web crawler application may have a selection policy geared toward downloading Web pages and the content contained therein relating to pharmaceutical industry drug data. This policy may provide a uniform policy for revisiting certain Web sites displaying pharmaceutical industry drug data where all Web sites are re-visited with the same frequency, regardless of the rate of content or Web page change taking place on the site. In some embodiments, a proportional policy may be invoked where Web sites are re-visited based upon the frequency of Web page or content change on a particular Web site. In some embodiments, the crawler application itself engages in, for example, path-ascending crawling, focused crawling, deep Web crawling, and/or may restrict the number of followed links that it analyzes. Some embodiments may include some other suitable Web crawler application(s).

Public data warehouses 218 may include an online interface and a data storage mechanism. For example, a Web-based interface may be provided such that a user may access the public data warehouse 218 to search for patents or publications related to an issued patent. Examples of a public data warehouse 218 include the USPTO Web site (www.uspto.gov), the Food and Drug Administration's (FDA) Web site (www.fda.gov), and the World Intellectual Property Organization (WIPO) Web site (www.wipo.int).

Private data warehouses 220 may include online or offline data stores. Online data stores may be configured similar to public data warehouses 218, such as by providing an interface (e.g., a Web browser interface) to a data source (e.g., a database). Examples of private data warehouses 220 include Thompson WESTLAW® (www.westlaw.com) and LEXIS-NEXIS® (www.lexis.com). Typically private data warehouses 220 include a membership or subscription to browse, view, or search data. Other private data warehouses 220 may use a "pay per use" fee structure.

The patent database 212 may include data such as published patent applications, issued patents, publications, objective and subjective patent data and the like. The patent database 212 may be implemented as a relational database, a centralized database, a distributed database, an object-oriented database, a flat database, or other database type depending on the specific embodiment. In some embodiments, the patent database 212 includes one or more databases (e.g., a patent database, a publications database, a user database, a search terms database, a claim limitations database, a ranking database), such that the combination of the one or more databases may be referred to as a patent database.

During operation, in one embodiment, patent reference information is collected and stored in the patent database 212. A user (not shown) may access the patent analytics system 102, such as by using a client computer 104 over the network 110. The user may select a patent application or publication of interest and review one or more references related to the patent application or publication. In some embodiments, summary reports or other information may be sent to the user, for example at the user's request or periodically, via the messaging server 206. The user may further submit subjective patent data (e.g., claim breadth) and objective patent data (e.g., type of a patent claim) to the patent analytics system 102. The patent analytics system 102 may then store the received subjective and objective patent data in the patent database 212 such that it is associated with the patent reference information. Messages distributed by the messaging server 206 may include one or more of e-mail, voice, text messaging, or other communication protocols or mediums. Further capabilities of the patent analytics system 102 are illustrated herein.

Database Component

Patents in the United States are granted to inventors of new processes, devices, manufacturable objects, and compositions. An issued patent gives the inventor the right to exclude others from practicing what is claimed in the issued claims of the patent for a period of time, in exchange for disclosure of information related to the invention such as the best mode known of practicing the invention and sufficient description in the specification portion of the patent for someone skilled in the area of the patent to practice what the patent claims. The claims of a patent are therefore used to define the scope of what the patent covers, and the remainder of the patent supports or explains what is covered in the claims.

Obtaining a United States patent involves filing a patent application with the Patent and Trademark Office (PTO), which is a government entity within the Department of Commerce. The patent application is examined for proper form, for novelty, and for other purposes. The process of examination is also referred to as patent prosecution. Patent prosecution may include one or more official PTO correspondences between the PTO and the inventor or the inventor's representative. Such correspondence may include assertions regarding suspected problems with the patent application by a PTO Examiner, as well as responses, which may include arguments or amendments, by inventors or their representatives. Information exchanged during this patent prosecution process is often useful in determining the scope of a patent, because amendments, arguments, or disclosures made during prosecution may limit the scope or validity of patent claims under some patent laws.

In certain situations, such as during litigation or re-examination, evidence may be used to interpret or limit the claims. During prosecution, a record is created. This prosecution record, including the patent itself, is considered "intrinsic evidence." In addition to intrinsic evidence, some "extrinsic evidence" may be referenced. Extrinsic evidence, such as dictionary definitions of terms and published papers or articles, may also be used to interpret or define terms or phrases used in claims. Gathering and evaluating intrinsic and extrinsic evidence is time consuming and burdensome. Typically, to determine relevant intrinsic evidence, the patent prosecution record and references used during prosecution may be obtained and carefully evaluated by legal personnel. Additionally, to obtain extrinsic evidence, publications (e.g., papers, books, dictionaries, technical manuals, etc.), or experts may be consulted.

The process of gathering and organizing intrinsic and extrinsic evidence related to a patent application's prosecution is expensive and time-consuming. Various factors including the volume of information that must be considered and the expertise and training required to provide a thorough legal analysis contribute to this burden.

FIG. 3 is a schematic of a system diagram 300 illustrating the data request 112. Illustrated is a patent analytics system 102 making a data request 112 of an electronic orange book Web site 302 over a network 110. Some embodiments may include making a query (e.g., a search query) of any one of a number of regulatory or non-regulatory Web sites controlling the flow of publicly available or privately available information from public or private data warehouses. In one example embodiment, a data request 112 may be in the form of a Hyper Text Transfer Protocol (HTTP) or Secured Hyper Text Transfer Protocol (HTTPS) method call to GET a particular Web page containing data relating to a particular active ingredient in a drug (e.g., fluticasone). Additionally, in some embodiments, this GET request may center on a GET request seeking data relating to the commercial or trade name for a drug. For example, a data request could be made for the active ingredient paroxetine hydrochloride or the drug PAXIL™. Further, in some embodiments, an HTTP or HTTPS HEAD method call may be invoked to make a data request.

FIG. 4 is a schematic of a system diagram 400 illustrating the providing of drug data 114, in response to the data query 112. Drug data 114 is illustrated as being provided to the patent analytics system 112. In FIG. 4, drug data 114 relates to, for example, the active ingredient fluticasone, and a variety of listings 401 are displayed relating to this active ingredient. Also illustrated, is the method of use 402 and additional information 404. The listings for fluticasone are not limited, as indicated by the continuation ellipsis 403, to those illustrated in drug data 114. As illustrated, this drug data 114 may, for example, be in the form of a Web page containing data relating to a particular active ingredient in a drug and may include the name of the drugs (e.g., trade name or otherwise) associated with the active ingredient, the patents claiming the active ingredient, certain exclusivity periods (e.g., FDA exclusivity periods) associated with the drug, file wrapper information, Abbreviated New Drug Application (ANDA) information and histories, or any other type of information that may be posted to a Web site (e.g., text files). Once this information is received, it may be parsed into a predefined format so as to allow it to be stored into a database for easy access and display.

Example Logic and Interfaces

Figure 5:
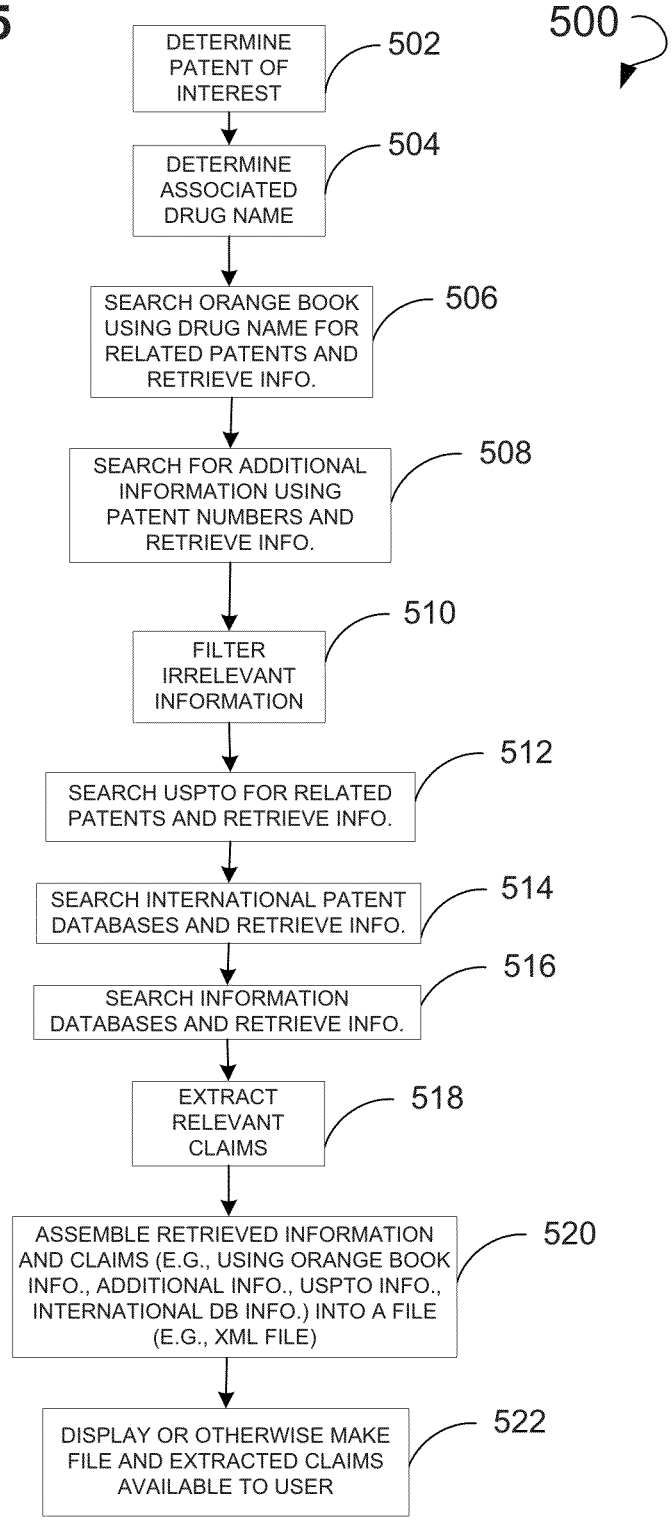
FIG. 5 is a flowchart illustrating a method for a pharmaceutical-based example of assembling and using relevant reference material, according to an example embodiment.

FIG. 5 is a flowchart 500 illustrating a pharmaceutical-based example of assembling and using relevant reference material. Illustrated are a number of operations (e.g., 502, 504, 506, 508, 510, 512, 514, 516, 518, 520, and 522) that are used to implement the method 500. As a threshold matter, while these operations illustrate various functionality associated with data in the chemical and biotech. arts, as previously illustrated these operations may also be used to process data arising from other fields of art such as the electrical and software arts. For example, in lieu of searches being conducted of the Orange Book Web site using drug names, a search may be conducted of the IEEE or ACM Web site using the name of an algorithm or piece of software.

At 502, a patent of interest is identified. Using the patent, a drug name of interest is identified through the implementation of operation 504. For example, if a user is attempting to evaluate the validity or position of infringement of a pharmaceutical patent, the drug name may include the primary operation of the patent. Using the drug name, a regulatory database (e.g., the Orange Book) may be searched and information retrieved via the implementation of an operation 506 to produce related patents. Related patents may include patents in a "patent family" (e.g., parents or descendents based on continuation, divisional, or other related applications). In addition, periods of exclusivity may also be collected. The related patents provide additional search criteria for further searching of other data sources, such as the ANDA filings or other technical information databases. At 508, an operation is illustrated such that the related patent numbers are used to search and information retrieved from these sources for additional drug filings, drug, formulation, or ingredient information. The combined collection of search results (e.g., retrieved information) from block 506 and block 508 is filtered or "scrubbed" at 510, such as to remove irrelevant information with regard to one or more claim limitations included in the identified patent from block 502. Filtering may include actions such as removing duplicate search terms, consolidating search terms, determining synonyms of search terms, comparing search terms to terms found in the patent of interest or its claims, or other steps to pare down terms to a core of relevant search terms.

The relevant search terms may then be used in one or more progressive searches, such as to search the USPTO (see e.g., operation 512) for additional U.S. patents or patent applications not found in the Orange Book, search international patent databases (see e.g., operation 514) for relevant non-U.S. patents or patent applications, or search information databases (e.g., technical database or the World Wide Web) for relevant non-patent literature (see e.g., operation 516). The relevant patents obtained from searches of domestic 512 or international 514 databases may be further processed by extracting relevant claims via the implementation of operation 518. Relevant claims may include claims that recite the composition or formulation of an active ingredient, including those that include a drug carrier, methods of manufacturing the active ingredient in the drug, methods of manufacturing the active ingredient in the drug, methods of using the active ingredient (e.g., methods of treatment), or specific formulations of the active ingredient (e.g., formulations including a salt, solvate, polymorph, or metabolite of the active ingredient, or a pro-drug of the active ingredient). The augmented collection of information from the various sources may be stored in the patent analytics system 102, such as in the patent database 212. Once the relevant claims are extracted, an operation 520 is carried out that assembles retrieved information into a file, data stream, or the like. Further, the operation 520 may assemble the retrieved information and extracted relevant claims, and to place this information and extracted claims into some type of file (e.g., an XML based file) for future use or display. As reflected in the implementation of operation 522, portions of the U.S. patents and applications, non-U.S. patents and applications, and non-patent literature may be presented to a user in one or more forms, as illustrated herein, including clean claims, marked up claims, and various versions of claim charts.

FIG. 6 illustrates some embodiments of a user interface to display claims and relevant references associated with claim limitations within each claim. To illustrate this embodiment, an example patent, U.S. Pat. No. 5,070,877, is presented. In FIG. 6, claim limitations 600A, 600B, 600C are shown. In some embodiments, claim limitations 600A, 600B, 600C are delimited using a special character or set of characters. For example, in the example illustrated, limitations are delimited using left and right angle brackets, (e.g., '<' and '>'). Use of textual marking may be advantageous on systems that are incapable of producing or presenting text font modifications, such as bold, italic, or the like. In a dynamic user environment, claim limitations 600A, 600B, 600C may be implemented to programmatically respond to one or more user actions, such as a mouse movement or click or a keyboard command. When the user activates or actuates a claim limitation 600A, 600B, 600C, for example by moving a cursor over a selected limitation, a popup window 602 may be presented. In the example configuration, shown in FIG. 6, the popup window 602 includes a collapsible hierarchal menu 604 with one or more intrinsic or extrinsic references 606A, 606B, 606C and controls (e.g., hyperlinks) 608A, 608B to view one or more electronic formats of each reference. For example, controls 608A, 608B may include a hyperlink to a word processing document, an image, or other viewable or editable representation of at least the relevant portion of the associated reference. In this example configuration, hyperlinked images are presented that, when activated, open or access a .pdf or MICROSOFT WORD™ formatted document, depending on the hyperlink used. Once a document or other file is opened or accessed, the user may view, copy, edit, or otherwise manipulate the document or file.

Figure 7:
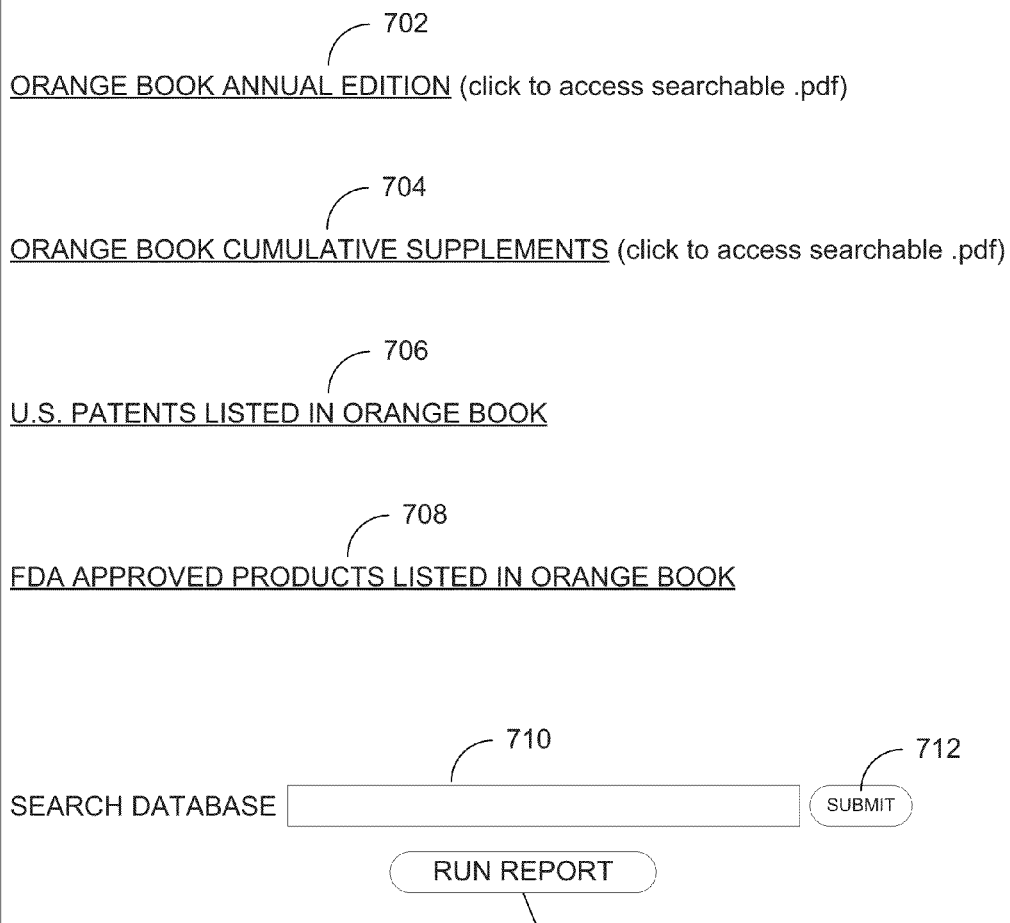
FIG. 7 illustrates a directory screen, according to an example embodiment.

FIGS. 7-10 illustrate screenshots of an example search and report interface that uses a patent reference system (e.g., 102 in FIG. 2). In embodiments, the screens illustrated in FIGS. 7-10 may be implemented using a Web browser (e.g., Netscape or Internet Explorer) or other client program. FIG. 7 illustrates an example of a directory screen 700 (e.g., homepage). The directory screen includes one or more links to reference information, such as a link to an annual edition of the Orange Book 702, a link to cumulative supplements of the Orange Book 704, a link to U.S. patents listed in the Orange Book 706, and a link to FDA approved products listed in the Orange Book 708. A user may activate (e.g., click) a link to display the corresponding information. For example, activating the link to the annual edition of the Orange Book 702 may navigate the user to an electronic copy of the Orange Book, such as in PDF™ or MICROSOFT WORD™ format. Similarly, activating the link to cumulative supplements of the Orange Book 704 may navigate the user to electronic copies of supplements to the Orange Book. In embodiments, the electronic copies may include PDF™ format, MICROSOFT WORD™ format, plain text format, or the like. Electronic copies may be searchable by the user, such as using a searchable .pdf format. Activating the link to U.S. patents listed in the Orange Book 706 may, in one embodiment; navigate the user to a screen listing the patents contained in a particular edition of the Orange Book. The screen listing may be sorted or ordered by date, patent number, drug information, assignee information, or other categorizations. In some embodiments, the screen listing may include a link to an electronic copy of the corresponding patent. The electronic copy may be in .pdf format, MICROSOFT WORD™ format, an image format (e.g., .png, .gif, .jpg) or other formats compatible with a Web browser or client program. Similarly, activating the link to FDA approved products listed in the Orange Book 708 may navigate the user to one or more screens displaying product information.

In addition to the navigation links 702-708, the directory screen 700 includes a search input control 710. The search input control 710 may be implemented as an HTML form control in some embodiments. The user may provide one or more search strings and activate the "submit" control 712 to initiate the search. In some embodiments, the search's domain includes the annual edition of the Orange Book, any cumulative supplements to the Orange Book, and a patent reference database (e.g., 212 in FIG. 2). When a user submits a search, one or more fields may be automatically searched, such as active pharmaceutical ingredient (e.g., chemical name), proprietary name (e.g., trademarked name), molecular formula, names of any commercially marketed formulations having the specified active ingredient, indication of use, sales of drug (e.g., $USD per year), type of formulation (e.g., gel, lotion, ointment), route of administration (e.g., topical, oral, IV, IP, rectal, buccal), patent holder (e.g., assignee, licensee), marketing company (NDA/ANDA Holder), application number (FDA), patent number, claim terms, patent expiration date, or FDA period of exclusivity. In some embodiments, a user may be provided one or more controls, such as HTML form controls, to select or choose which of the one or more fields to search.

Finally, an example run report control 714 is displayed on the directory screen 700. By activating the run report control 714 a user may generate a formatted report, such as illustrated in more detail below, using one or more search terms provided in the search input control 710.

FIG. 8 illustrates an example of a search results screen 800 that may be displayed to the user as a result of executing a search using the search input control 710 and the submit control 712. The search results screen 800 provides the user a formatted list of documents, or portions of documents that match the search query (e.g., search terms in a particular search domain). The example illustrated in FIG. 8 displays the results of a search for "testosterone." As illustrated, patents retrieved from entries found in the Orange Book related to the search term "testosterone" are presented in the search results. Additionally, references related to the patent documents found are also presented. In embodiments, a search engine may search the Orange Book, the cumulative supplement to the Orange Book, or other sources, such as the patent database 212 to compile the search results. In the example shown, each search result title is presented as a link (e.g., hyperlink), which a user may actuate or activate (e.g., click or mouse over). Upon activation, the user may be navigated to or presented with, such as in a popup window or other user interface mechanism, the document cited in the search results. In some embodiments, a dynamic popup window may be presented when the user move the cursor over the title of a search result. The dynamic popup window may contain more information about the cited reference, such as the patent applicant, assignee, expiration date, cited references, other references, office actions or other PTO correspondence, an expanded passage where the search term was found, or other details about the reference. The dynamic popup window may be activated by the user to navigate to the particular related document, document section, or present other information represented in the window. In some embodiments, activating a term in a dynamic popup window may execute an additional search using the indicated term. For example, when a user moves the cursor over the search result of U.S. Pat. No. 5,152,997 802, a dynamic popup window 804 may be presented. When a user activates a term, such as the assignee "Theratech, Inc." a search may be initiated using the activated term.

Figure 9:
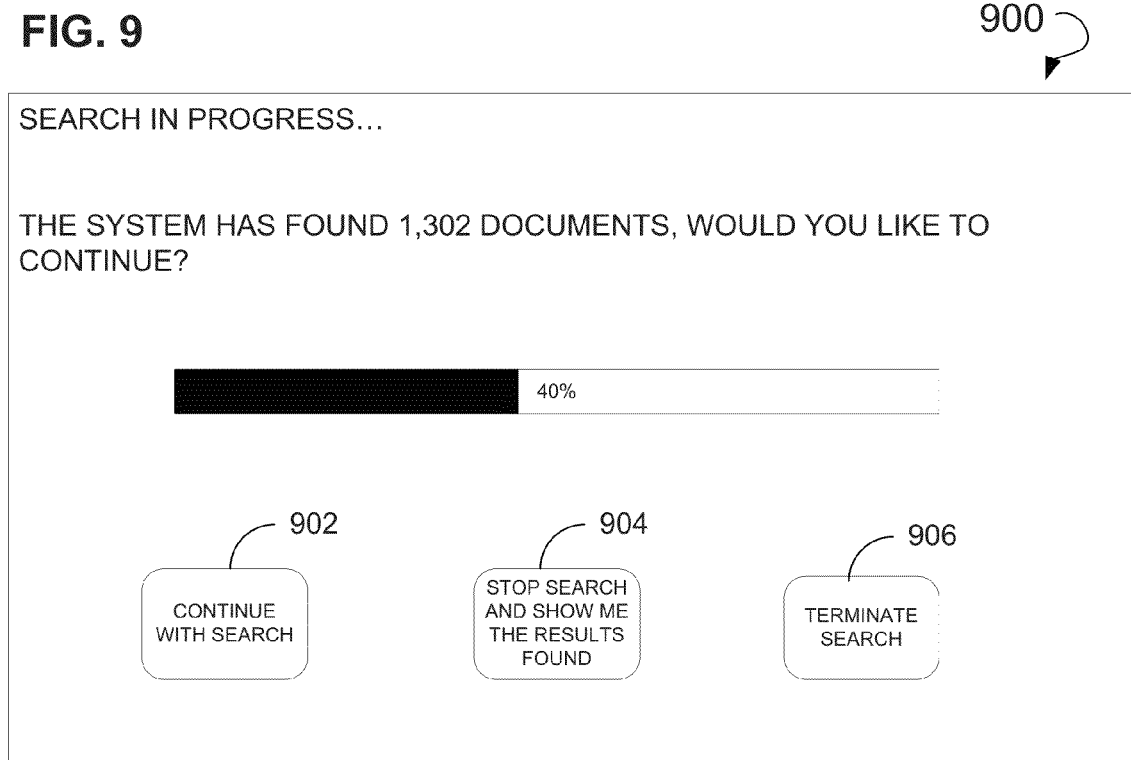
FIG. 9 illustrates a search in progress screen, according to an example embodiment.

In some embodiments, when a search is detected to possibly return a large number of results, the user may be notified of such a condition and be provided a control to terminate the search. FIG. 9 illustrates an example of a search in progress screen 900. The search in progress screen 900 may be programmatically set to appear when a threshold number of results are determined to exist. For example, when over 1,000 results are found, a user may be presented with the search in progress screen 900, where the user may terminate the search or allow it to continue. In the example shown, in response to an interrupted search, a user may activate a continue control 902, a stop and view control 904, or a terminate search control 906. If the user activates the continue control 902, the search may continue to its normal completion, possibly returning a large number of search results. If the user activates the stop and view control 904, the search may immediately cease operation and the user may be presented with the results found at the point when the search was ceased. If the user activates the terminate search control 906, the search may be canceled and, in one example, the user may be provided a search input control to provide additional search terms for a successive search.

After performing one or more searches, a user may determine a particular drug of interest. FIG. 10 illustrates an example of a report generation screen 1000. In some embodiments, using the run report control 714 in FIG. 7, the user may navigate to the report generation screen 1000. The user may enter a particular drug name in the search input control 710 in FIG. 7. The system can then use the provided drug name to perform a background search of the patent database 212. The user is then presented with the report generation screen 1000 and can check one or more detail checkboxes 1002 to indicate what information to include in the report. After selecting the desired output options, the user can activate the submit control 1004 to initiate the report generation. Report output may be in a tabular, list, or other format. The output may include links to documents, (e.g., .pdf documents, spreadsheet documents) or plain text. In some embodiments, .pdf documents are in a searchable text format. In some embodiments, when information is incomplete regarding a particular detail, the detail checkbox and description may be presented differently to indicate to the user that the option is not available in the report. For example, in FIG. 10, the dosages detail control 1006 is disabled and indicated as such using italic font. In other examples, other font effects or user interface indications, such as a grayed-out font or control may be used.

In some embodiments, the system and method illustrated herein may provide a user with multiple ways to search a dynamically linked database of patent reference information; provide intelligent filtering, categorization, and organization of patent information from disparate sources; and provide a powerful and flexible reporting feature.

In the examples and embodiments illustrated above, the references, whether associated with a claim limitation manually, automatically, or by some combination thereof, may all be useful in a variety of applications. Certain processes may be largely automatic, such as where data, related to a pharmaceutical name, is automatically collected by a program or other automated agent. Other processes may include manual processes, such as search techniques used to find relevant business method patents, which are typically more abstract and may use less standardized language.

The evidence regarding the meaning and scope of claim limitations is useful to patent attorneys and others for a multitude of purposes, including determination of the scope or extent of a patent, which may be used to determine patent validity, questions of infringement, or patent value. These determinations are examples of what are often investigated when patent attorneys draft opinions or opinion letters. For example, a person marketing an invention may wish to have the validity of another inventor's patent covering the new product investigated, in hopes that the patent may be found to be invalid for some reason. As another example, a patent owner assessing whether to assert a patent against a potential infringer may wish to confirm the validity of the patent before contacting the potential infringer regarding licensing fees or possible litigation.

Formal opinions regarding patent infringement can be particularly valuable, as a party having an opinion issued in good faith indicating a particular method, article, or composition does not infringe another's patent is generally shielded from triple or treble damages for willful infringement should the party later be found to infringe the other's patent. Similarly, the party wishing to assert a patent may often investigate not only the validity of their own patent before asserting it, but may also obtain an infringement opinion to determine whether the suspected infringing product in question is in fact infringing on the patent to be asserted.

In various embodiments, extraction and organization of claim limitations and related intrinsic and extrinsic evidence may provide one or more advantages to users (e.g., patent attorneys), such as assisting in determination of the scope or extent of a patent to evaluate validity, infringement, or patent value. Such evaluations may be useful when forming legal opinion, considering lawsuits, or assessing licensing opportunities.

In some embodiments, a method is illustrated as including receiving a search query (see e.g., operation 502), the search query relating to a patent, retrieving (see e.g., operations 508-518) data relating to a term contained in a claim limitation in the patent, the data including at least one of intrinsic or extrinsic evidence associated with the term by a hyperlink, and displaying the claim limitation and the hyperlink (see e.g., operation 910). In some embodiments, the hyperlink includes a mechanism to present a popup menu containing a plurality of references defining the term contained in the claim limitation. Additionally, the popup menu may display the intrinsic evidence. A further hyperlink to an electronic document containing the intrinsic evidence may also be displayed. The popup menu may also display extrinsic evidence. Also, a further hyperlink to an electronic document containing the extrinsic evidence may also be displayed. The hyperlink may include a mechanism to present a first popup menu containing the intrinsic evidence, and a second popup menu containing the extrinsic evidence. Moreover, the intrinsic evidence may include at least one of a specification of the patent in which the claim limitation appears, another claim of the patent, or a prosecution history of the patent. The extrinsic evidence may include at least one of a publication, another patent, expert testimony, testimony of an inventor on the patent, or a dictionary definition.

Analytics

As discussed above, once the underlying reference patent data (e.g., the objective patent data) has been gathered for relevant drugs and patents, subjective criteria may be applied to the resulting patent claims. In an example embodiment, this process is implemented without the use of an artificial intelligence algorithm, but rather more closely resembles attorney work product. Companies may wish to rank and rate patents and their underlying claims by a myriad of criteria. In an example embodiment, a user interface is presented to a user of the system to categorize one or more patent claims in the database by one or more subjective criteria. The criteria may include if a claim covers a commercial product, whether or not a claim is listable in orange book, claim scope, claim type, and claim category. In an example embodiment, only the independent claims of a patent are presented to a user for categorization.

Figure 11:
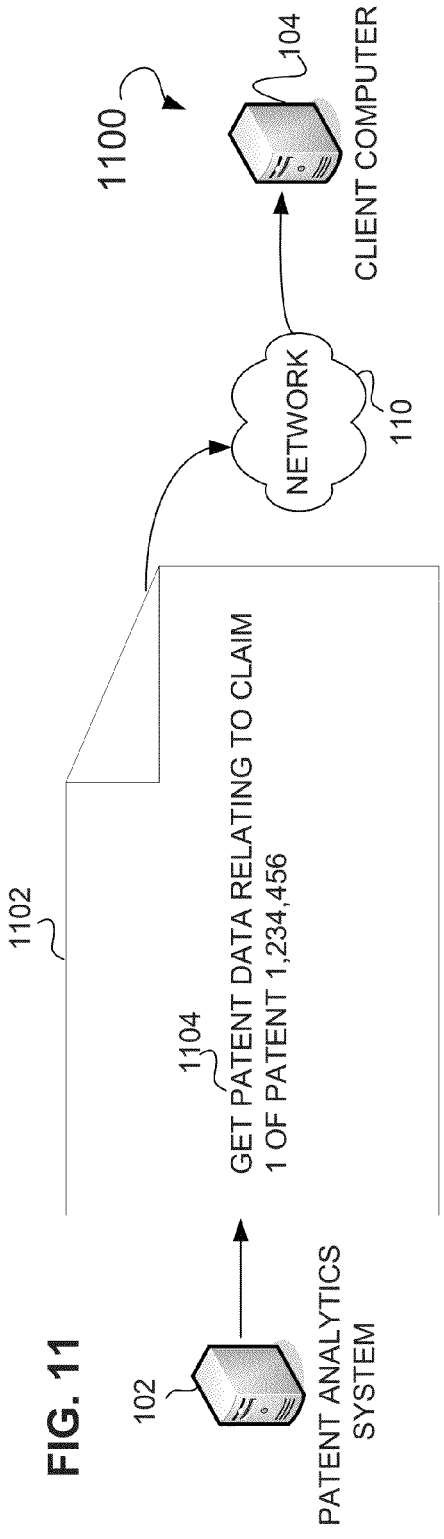
FIG. 11 is a schematic of a system diagram illustrating a ranking request, according to an example embodiment.

FIG. 11 is a schematic of a system diagram 1100 illustrating a ranking request 1102. Illustrated is a patent analytics system 102 making a ranking request 1102 of a client computer 104 over a network 110. In one example embodiment, a ranking/rating request 1102 may be in the form of a user interface that is presented to a user utilizing the client computer 104. The patent analytics system may request ranking data for a claim that has been stored in the patent database 212 that has not yet been assigned any ranking data. In an example embodiment, upon the patent analytics system receiving drug data from regulatory websites and corresponding patent data, the system may send a message through the message server to a user requesting the user to enter ranking/rating data for the patent data.

Figure 12:
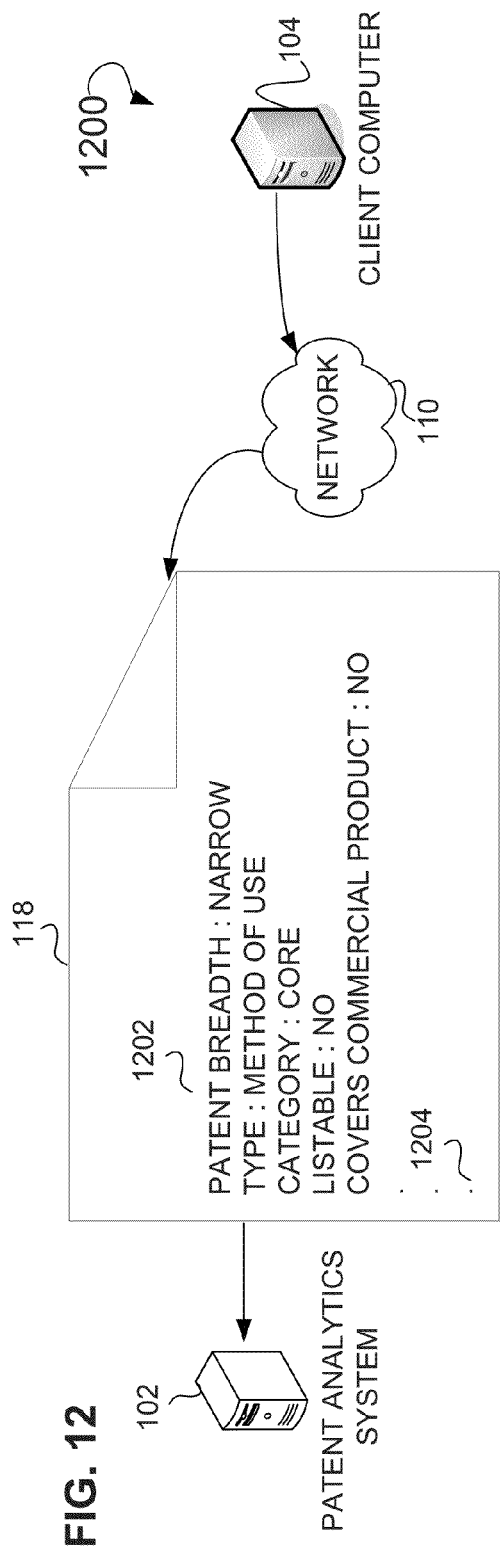
FIG. 12 is a schematic of a system diagram illustrating the providing of ranking data, according to an example embodiment.

FIG. 12 is a schematic of a system diagram 1200 illustrating the providing of ranking data 118, in response to a ranking request 1102. Ranking data 118 is illustrated as being provided to the patent analytics system 112. In FIG. 12, ranking data 118 relates to, for example, the breadth, type, and category of a patent claim as well as if it is listable in the Orange Book and if it covers a commercial product. As illustrated, this ranking data 118 may, for example, be in the form of a Webpage containing data related to a patent claim. Once this information is received, it may be parsed into a predefined format so as to allow it to be stored into a database for easy access and display. In some example embodiments the ranking data is communicated to the patent analytics system 102 without first receiving a ranking request 1102. This allows a user to fill in ranking data for patent claims stored in the patent database 212 as he or she chooses. As illustrated by ellipses 1204, further ranking data may be transmitted to the patent analytics system 102. This may include the reasoning behind a particular ranking.

FIG. 13 illustrates an example user interface 1300 that may be presented to a user on a client computer 104 to enter ranking data 118. Illustrated is example patent reference information 1302 with the language 1304 of claim 1. Further illustrated are example ranking options for the claim including claim scope 1306, claim type 1308, claim category 1310, whether of not it would be listable in the Orange Book 1312, and if it covers a commercial product 1314. Some of the ranking data may be subjective whereas other ranking data may be objective. Further illustrated are text fields that allow a user to detail why a patent claim was ranked in a certain manner. Each types of ranking data illustrated is described more fully below. As will be appreciated by one skilled in the art, user interface 1300 only illustrates example ranking data options. The user interface 1300 may be modified to include additional ranking options such as a rating for the ease in which a claim may be designed around as well as the potential value of a patent claim to a client.

Three example user activity controls 1316, 1318, and 1320 are illustrated in FIG. 13. User activity control 1316 may allow the user to submit the ranking data entered in user interface 1300 to the patent analytics system 102. The ranking data may be formatted to allow easy parsing and storing by the patent analytics system 102. For example, the data may be formatted according to a defined XML schema. The next claim user activity control 1318 may also transmit the ranking data to the patent analytics system 102 while also presenting the next claim in the patent. Cancel user activity control 1320 allows a user to not have the ranking data transmitted to the patent analytics system 102.

In an example embodiment, a determination is made as to whether or not a patent claim covers a commercial product 1314. This determination may be aided by examining data in the Orange Book if available. In some example embodiments, a user may indicate the drug or drugs (or other commercial product) that a patent claim may cover. In further example embodiments, the patent database may store numerical representation of "yes" or "no" determinations as '1' and '0.' In some example embodiments, an option may be presented to indicate that a user is unsure as to whether or not a patent claim covers a particular commercial product. These claims may then be reviewed en masse by more knowledgeable personnel at a later time to make a final determination as to the applicability of a claim to a particular commercial product.

As discussed above, a covered drug may or may not be listable in the Orange Book. In an example embodiment, users of the system are given a choice of "yes" or "no" in relationship to whether a particular claim is listable in the Orange Book. In some example embodiments, the reason why a user of the system believes a patent claim is or is not listable is stored along with a determination of "yes" or "no" in a database. In further example embodiments, the system may use numerical values to represent a user's categorization of each patent claim. For example, the system may store a "yes" as '1' and "no" as '0.'

Claim scope may be determined to be broad, intermediate, or narrow. An advantage of utilizing fewer categories may be that a patent attorney can quickly rank many patent claims. In further example embodiments, more categories may used to detail a claim's scope with more specificity. For example, a rating scale of one to ten may be used in place of the qualitative descriptions with one being broad and ten being narrow. This added granularity may allow a company to allocate resources more efficiently in determining whether or not a patent may easily be designed around, licensed, etc. In some example embodiments, the reasoning for each ranking/rating may be stored with the patent claim.

As described above, patent types may include compound, method of use, polymorph, hydrate, and method of medical use. Other possible type categories may include composition claims, processing claims, and product-by-process claims. In some example embodiments, a user of the system may have the ability to define additional patent claim types if the predefined types do not accurately describe the patent claim. In making the determination of what type each patent claim belongs to, the user may indicate a particular reason for the categorization as to allow non-legal and non-technical personnel to better understand a particular patent claim.

Pharmaceutical companies may wish to determine a category for each patent claim. These categories may include, but are not limited to, "core," "ancillary," and "evergreen." The "core" category may include patent claims that relate to a genus of compounds, without any other limitations, in which the referenced compound (API) falls. The "core" category may also include a specific compound designated by name or structure, without any other limitations, that corresponds to the referenced compound (API). In an example embodiment, claims categorized as core may include a pharmaceutical composition that broadly includes a carrier/excipient and the "core" compound, without any other limitations. The "core" may further include a method of medical treatment that includes administering the "core" compound, to treat a broad or narrow class of diseases or disorders, without any other limitations. In some example embodiments, basic methods of manufacturing the referenced "core" compound, without any other limitations, may also be categorized as core patent claims.

In an example embodiment, patent claims categorized as "ancillary" are considered follow-up patent claims. For example, a pharmaceutical composition that more narrowly includes a carrier/excipient and the "core" compound may be an ancillary patent claims. In an example embodiment a method of medical treatment that more narrowly includes administering the "core" compound, to treat a broad or narrow class of diseases or disorders may be categorized as ancillary. Also, ancillary patent claims may include specific methods of manufacturing the referenced "core" compound.

In an example embodiment, patent claims categorized as life cycle management (LCM) or "evergreen" patents may cover one or more of the following categories. In an example embodiment, an LCM patent may cover compounds limited to specific stereoisomers (enantiomers, diastereomers, enantiomeric excess (EE), etc.). Further example embodiments may include compounds limited to specific polymorphs and compounds limited to specific hydrates, solvates or salts. An example embodiment of a LCM patent may include compounds (API, carrier, polymer, adjuvant, etc.) limited to specific purity levels. Compositions limited to "picture claims" of the commercial formulation may be considered an LCM patent. Further example embodiments may include compounds (API) limited to crystalline forms, business method claims (e.g., a method of ensuring patient compliance by including specific labeling), specific (narrow) processing (synthetic) methods (API and "key" intermediates), novel "key" synthetic intermediates, and dosing regimens. In an example embodiment LMC patents include subsequent methods of (medical) use/treatment: in vivo, in vitro, screening, etc. that are narrower "slices" compared to original claimed use and specific methods of (medical) use/treatment that are narrower "slices" compared to original claimed use: FDA label uses, off label uses, etc. Further example embodiments may include "mechanistic" types of method claims (e.g., inhibiting receptor Y by admin. compound X) and combination therapy/treatment with additional APIs style claims. In an example embodiment claims covering combination therapy/treatment with additional APIs and derivatives, metabolites, and pro-drugs are also considered LCM patent claims. Further example embodiments may include controlled release, immediate release and extended release formulations and combination therapy/treatment with additional APIs.

In order to facilitate the analytics component various user interfaces may be presented to a user of the system. For example, a user interface such as illustrated in FIG. 14 may be presented. Shown are text fields related to patent number, drug, and API. Also shown are options to display a patent centric, drug product centric, or API centric result view. A user may search the database using by submitting a search query by filling in one of the available fields and clicking search. The system may return search results in a table form associated with a user's selected preference. As illustrated in FIG. 14 the system may query the database for criteria matching the search query and present one or more patents. In some example embodiments, not all of the patents returned will have associated proprietary names. FIG. 15 shows example results in a proprietary-centric view. FIG. 16 illustrates example results in a patent number centric view.

Not shown in FIG. 14 are user-interface controls, such as checkboxes, that may be presented next to each patent number in the search results. A user may select one or more of the search results to rank by clicking on the checkboxes. As one skilled in the art will appreciate, there may be other ways for a user to indicate a preference to categorize the patents such as presenting radio buttons, etc. A user may then activate a control indicating the user wishes to rank the selected patents. The system may then present the user with an interface such as FIG. 13 to facilitate the ranking process.

In further example embodiments, all of the claims for a patent are presented. The user may select one or more of the presented patents claims to rank at the same time. After the user indicates how the claims should be ranked and rated, the user may submit the user's responses to the system. The system may then store the ranking and rating data in a database. In an example embodiment, the ranking data is stored such that it is associated with the patent claims already stored in the patent database. This may allow the patent analytics system to retrieve all relevant data for a patent in one location in the patent database.

Upon a user ranking one or more patents using subjective and objective criteria, the user (or other users) may search and filter the resulting information. For example, a search interface may be presented that includes the five categories described above. Further example embodiments include options to search using the subjective data as well as the objective data (expiration date, etc.).

Reports

In an example embodiment a user may generate reports utilizing the subjective and objective data stored in the patent databases. The objective data may include, but is not limited to, US sales, patent term expirations, FDA exclusivity expirations, US patents listed in Orange Book for particular drug, drugs with orphan status, drugs with same FDA approved indication (FDA label), drugs acting via same biological mechanism of action, drugs with same therapeutic category (Merck Index), drugs with same product category/sub-category (PDR), drugs with same API, and drugs administered via same route of administration. The subjective data may include, but is not limited to, whether a claim covers a commercial product, claim scope, claim type, claim category, and if the claim is listable in Orange Book. It is appreciated that some of the subjective data (e.g., claim type) may appear to be an inherently objective determination. However, user input is still required to make the final determination. This is contrast to the objective data that is generally pulled from websites in an automated process.

FIG. 17 is a schematic of a system diagram 1700 illustrating a report request 120. Illustrated is a client computer 104 making a report request 120 of a patent analytics system 102 over a network 110. In one example embodiment, a report request 120 may be generated from a user interface that is presented to a user utilizing the client computer 104. A user may request report data via the client computer 104 for any information stored in the patent analytics system. For example, the report request might be for patent scope and FDA periods of exclusivity data for a subset of the patents stored in the patent database 212. In an example embodiment as illustrated in FIG. 17, the report request 120 may formatted as a message that may be sent to the message server of the patent analytics system and the message may include header information 1702 and content 1704, 1706, and 1708. The header information 1702 indicates to the patent analytics system that the message pertains to a report request. In some example embodiments, patent contents 1704 indicate the patents the user wishes to include in the report and the category contents 1706 and 1708 indicate particular parameters the user wishes to include in the report. In further example embodiments, the report request 120 is formatted according to an XML schema or other suitable messaging format, as will be appreciated to one skilled in the art.

FIG. 18 is a schematic of a system diagram 1800 illustrating the providing of report data 122, in response to a report request 120. Report data 122 is illustrated as being provided to the client computer 104. In FIG. 18, report data 122 relates to the content requested in the report request 120. As illustrated, this report data 122 is formatted such that the patent claims 1802 are nested under their respective patents. Further illustrated is the requested content 1706 and 1708 as delineated by commas. In this manner, the client computer may easily parse the report data 122. As illustrated by ellipses 1804, further report data may be transmitted to the client computer 104. The additional report data may include additional patent claims not illustrated in FIG. 18, as well as diagnostic data including, but not limited to, error messages pertaining to patent claims that could not be found in the patent analytics system and content not found in the patent analytics system.

A report generation user interface 1900 as illustrated in FIG. 19 may be presented on a display device to a user to facilitate the process of generating a report request 120. Illustrated are a number of patents 1902 that a user may select to include in the report request, a plurality of parameters 1904, field indications 1906 of where to chart the parameters, a selected claim type parameter 1908, a reads on commercial product parameter 1910, and a generate report control 1912.

The patents 1902 illustrated may be presented in response to a search query. This may be done by the user submitting a search query to the system which may include one or more of the subjective and objective indicia already stored in the database. For example, the user may submit a search query that indicates the user wishes to examine all patents that relate to Crestor®. The system may generate an SQL expression that matches the user's search query to retrieve all patents that relate to Crestor® (e.g., by API). The results may be presented to the user with checkboxes next to each patent in the search results allowing the user to select or unselect each patent. The user may further limit the number of patents retrieved by filtering the results. For example, the user may indicate only patents still in force should be included in the report or the user may wish to only see patents filed by a certain entity. In some example embodiments, the results of the searching and filtering process may be saved in the system as a patent set. This may allow other users to generate additional reports based on the same patents without the need to generate an additional search query. In some example embodiments, when a user indicates a report should be generated from a saved patent set, the system prompts the user to choose whether or not the underlying search query should be submitted again as to include newly added patents. The user may then select all or a sub-set of the presented patents.

Illustrated is the selection of patents 1, 2, 4, and 7. Other search queries may be formatted with respect to the intrinsic, extrinsic, subjective, and objective data described herein.

All, or a sub-set, of the stored parameters 1904 including objective and subjective data fields may be shown to a user. The user may select a field for the x-axis of a graph and a field for the y-category. Various combinations of the fields allow users to create charts in relation to infringement and freedom to operate opinions as well as any other analysis needed. FIG. 19 illustrates the selection of the claim type parameter 1908 as the x-axis of the report and read on commercial product parameter 1910 as the y-axis of the report.

In an example embodiment, the generate report control 1912 submits the report request to the patent analytics system. In some example embodiments, error checking is completed before the report request is submitted to the patent analytics system. For example, some combinations of parameters may not be allowed such as the selection of more than one parameter for the x-axis. An error message may be presented to the user on the display device notifying the user to correct the problem. Further, diagnostic messages included within the report data may be presented to the user if action is required by the user. For example, if the patent claims selected do not have any claim rankings, the system may present a message to the user requesting the selection of a different parameter. In some example embodiments, the message includes an option to rank the patents with respect to the missing data.

Figure 20:
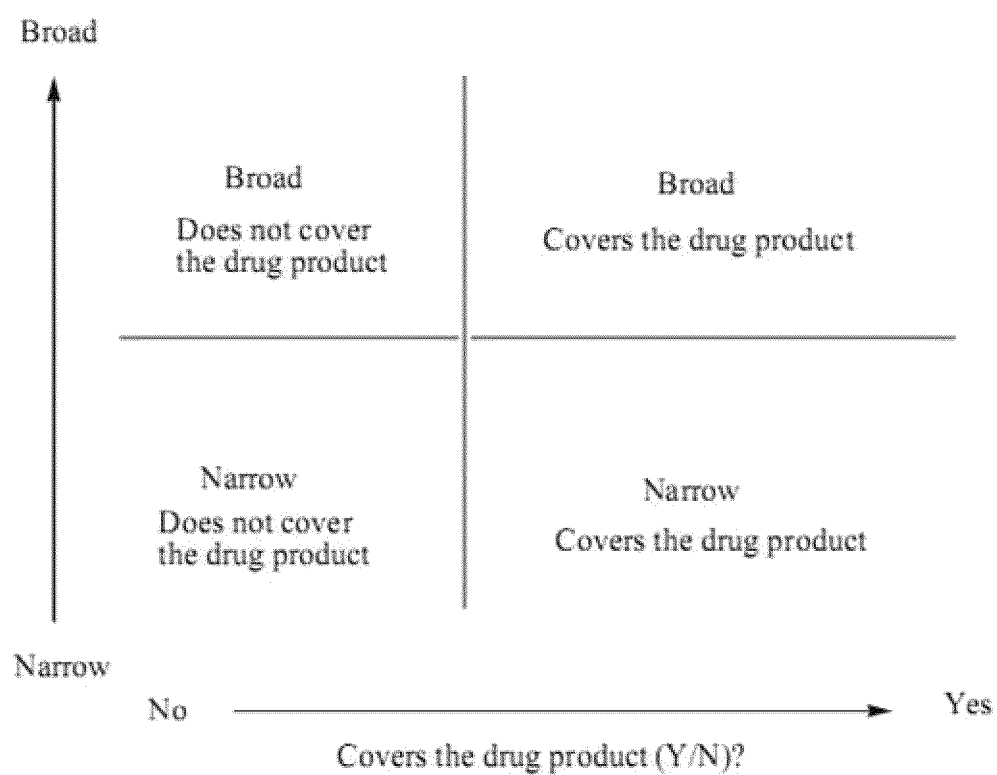
FIGS. 20-21 illustrate example charts comparing patent data, according to example embodiments.

In an example embodiment, upon receiving the report data, a chart may be generated and presented to the user. In some example embodiments, a chart is generated on the patent analytics system and transmitted to a client computer. For example, FIG. 20 illustrates a graph showing whether or not a claim covers a product on the x-axis and claim breadth on the y-axis. As illustrated, the upper right quadrant represents the intersection of broad claims that also cover the drug product and the lower right quadrant illustrates those claims that are narrow and cover the drug product. In contrast, the left two quadrants represent claims that do not cover the drug product with the upper left covering broad claims and the lower left covering narrow claims.

Figure 21:
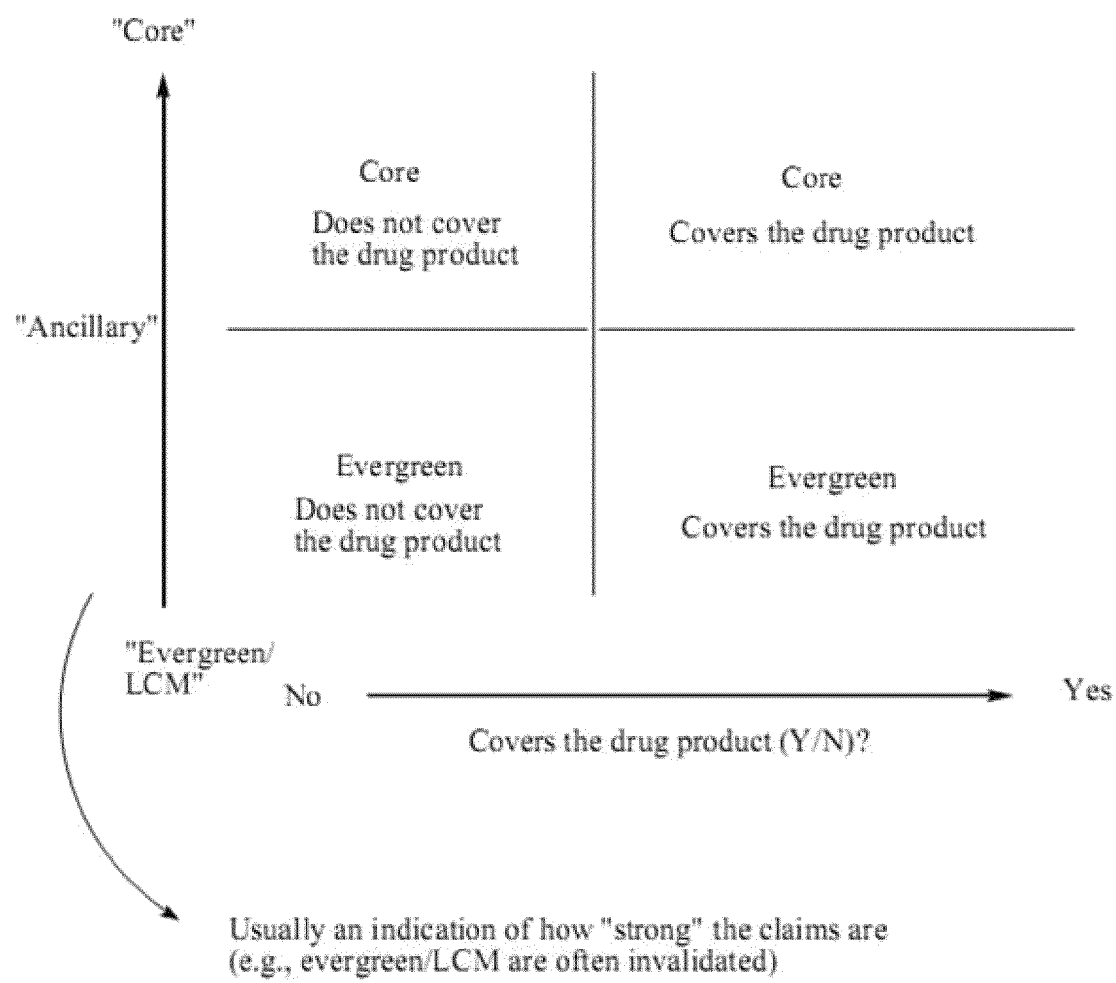

FIG. 21 illustrates a similar chart only instead of claim breadth, claim category is utilized for the y-axis. In an example embodiment, an evergreen style of claim is easier to defeat than a core component. The four quadrants shown represent core claims that cover a drug product (e.g., a commercial drug that a company wishes to genericize), evergreen claims that cover the drug product, core claims that do not cover the drug product, and evergreen claims that do not cover the drug product. By separating the claims, a company may allocate different amounts of resources in an efficient manner. For example, licensing attorneys may focus on core claims that cover the drug product while other attorneys might challenge the validity of the evergreen claims that cover the drug product.

FIGS. 22-36 illustrate example reports that may be generated by a report request. In some example embodiments, the reports are automatically generated on a periodic basis. For example, at the beginning of every month a select number of charts may be generated as to include any new patents that may have issued in the past month. The reports may be displayed in a variety of different manners as one skilled in the art will recognize. For example, FIGS. 22-36 illustrate reports that map a subjective parameters (e.g., type, category, scope) against objective parameters (e.g., expiration date, filing date, etc) as well as combinations that include subjective versus subjective and objective versus objective. The categorizations presented in the charts are illustrative only and do not represent any legal or technical conclusions on the part of the Applicant.

Figure 22:
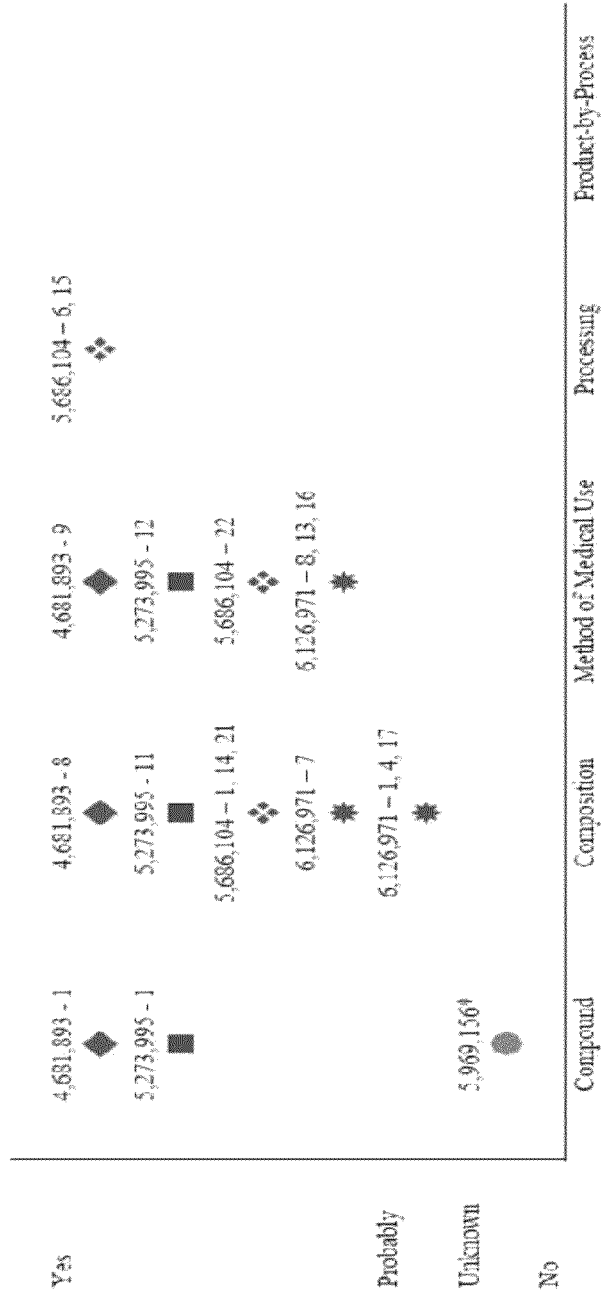

Each patent may include one or more claims in the report and therefore each patent may be included in report more than once. FIG. 22 illustrates that after each patent number, a claim number is shown to indicate which claims of the patent are relevant for that particular data point. For example, at the intersection of "Compound" and "Yes" U.S. Pat. No. 4,681, 893 is listed along with "-1" to signify that this particular categorization only applies to claim 1 of U.S. Pat. No. 4,681, 893. As illustrated, U.S. Pat. No. 4,681,893 is listed twice more for claims 8 and 9. If the number of claims is too great to illustrate on the graph directly a notation may be made next to the patent number. For instance, U.S. Pat. No. 5,969,156 includes a '*' notation that directs the user to the bottom portion of the report to see which claims are included for that particular data point. Each claim in the patent set may be given a symbol or color that is used each time the patent is presented in the report. For example, U.S. Pat. No. 5,273,995 has been assigned the square shape. In an example embodiment, colors may be used to further distinguish the different patents.

The report may include an interactive portion that allows a user to interact with the data points presented on the report. For example, a user may hover (use an input device such as a mouse and place the cursor over a point on the report) over the different claim types to see the definition of the claim type. Further, in an example embodiment, a user may hover over each data point to see the reason why a claim was categorized in a particular way. If more information is needed, a user may click on the data point and be presented with detailed information concerning the patent claim including all the subjective and objective indicia that are associated with the claim and its parent patent. In a further example embodiment, when a user hovers over a data point for a particular patent, other patents are dimmed to provide the user with a clear picture of all the claims in the patent currently being hovered over.

Figure 23:
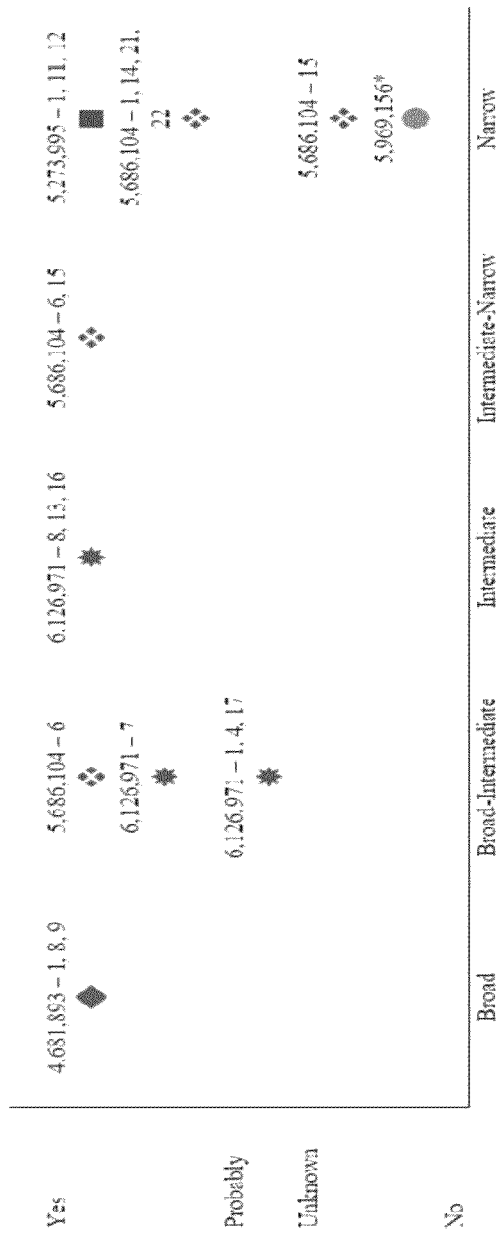
Figure 24:
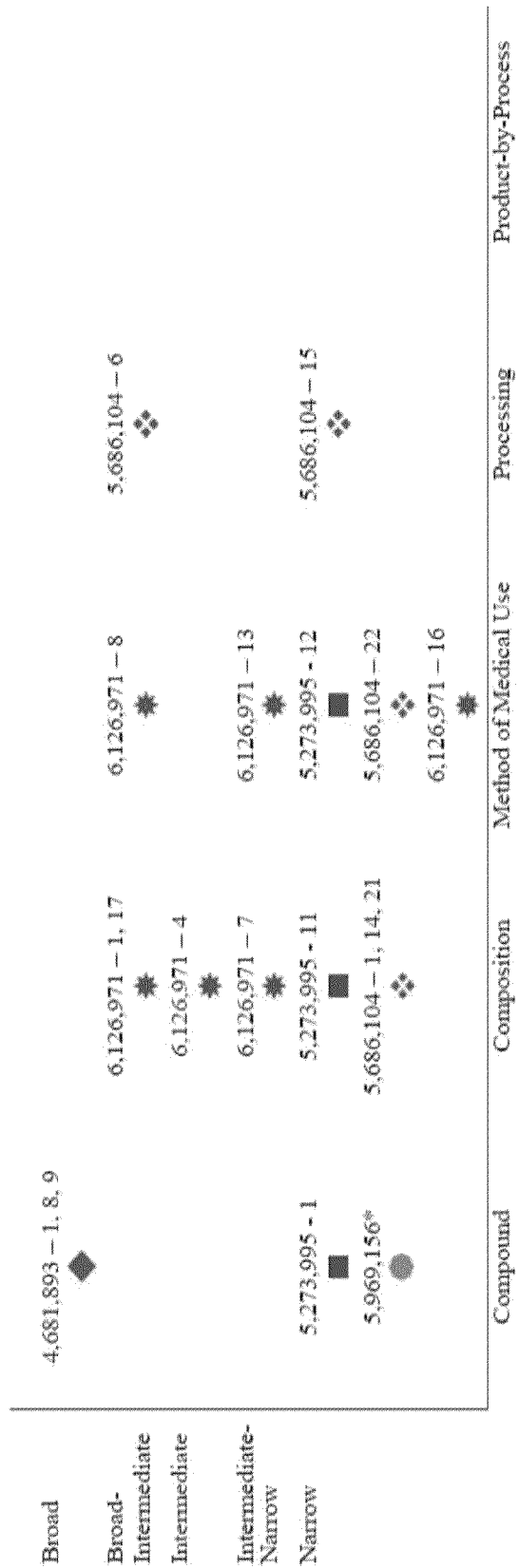
Figure 25:
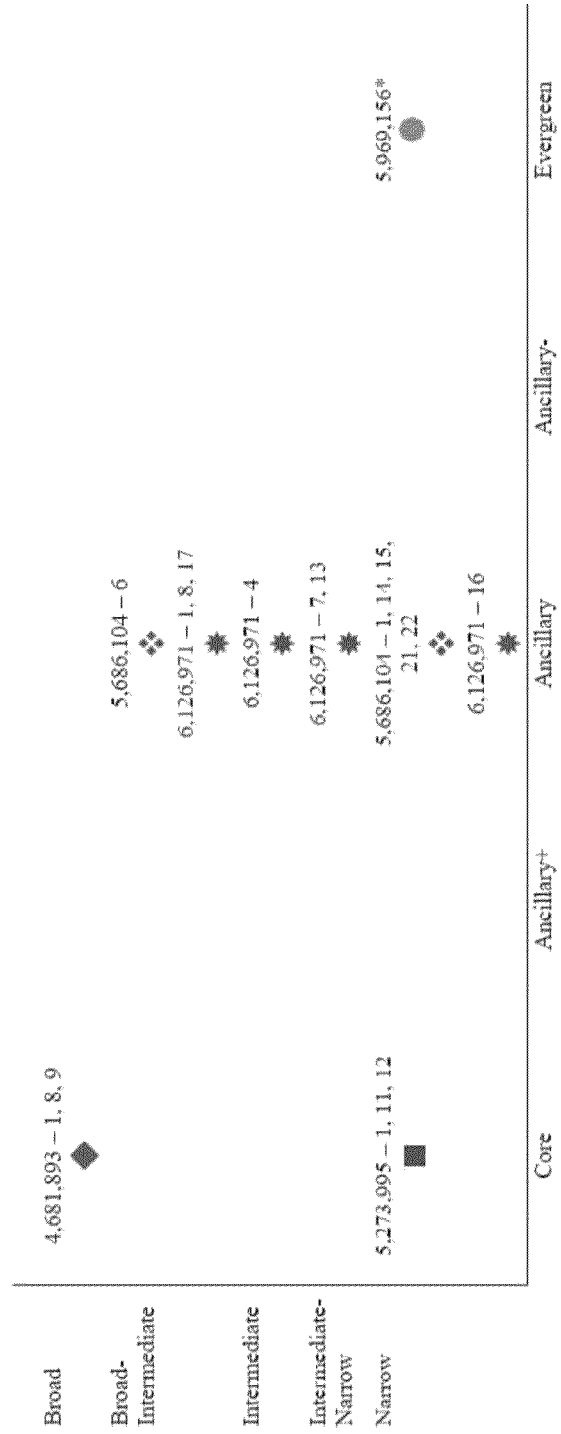
Figure 26:
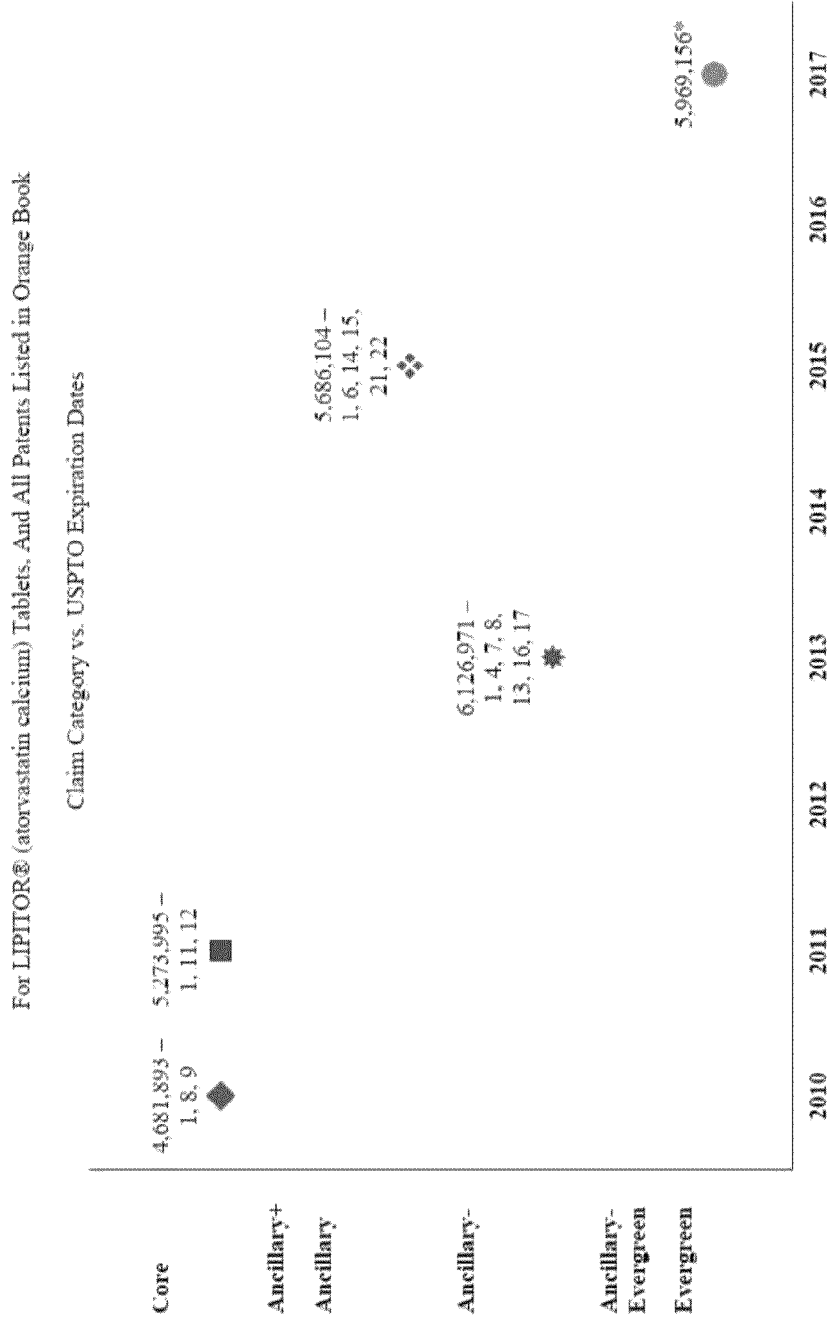
Figure 27:
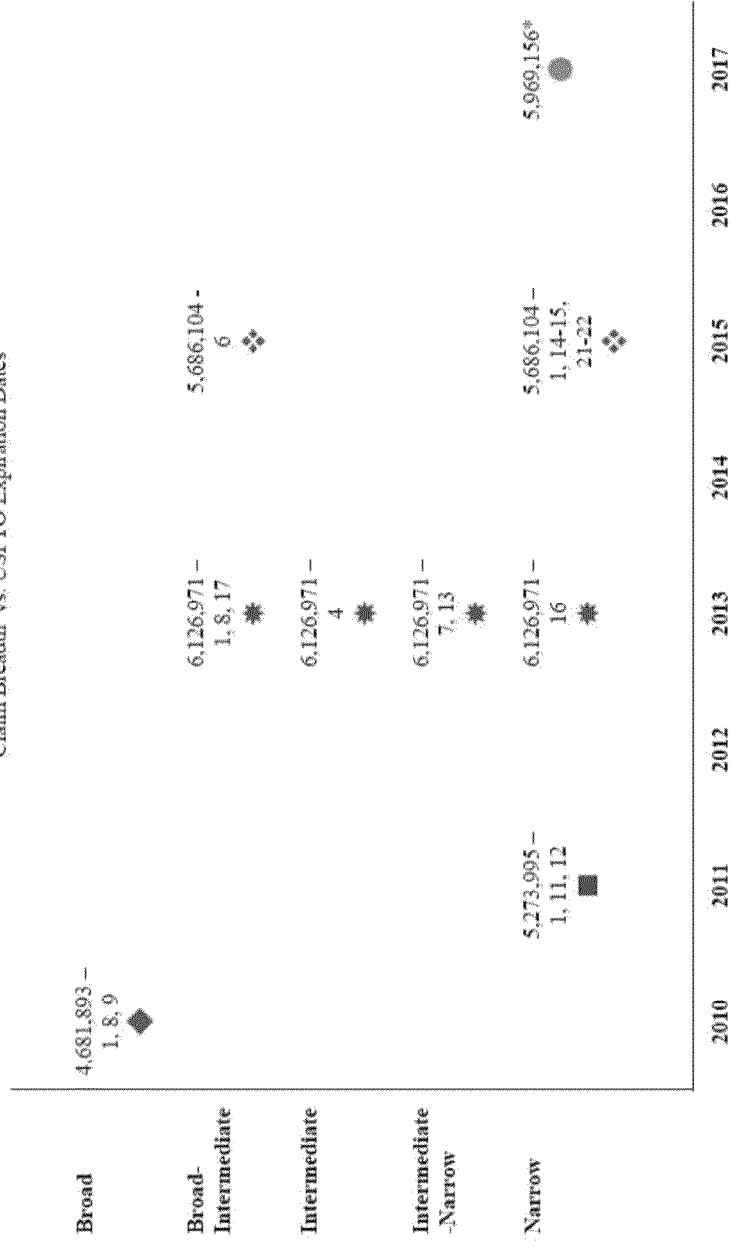
Figure 28:
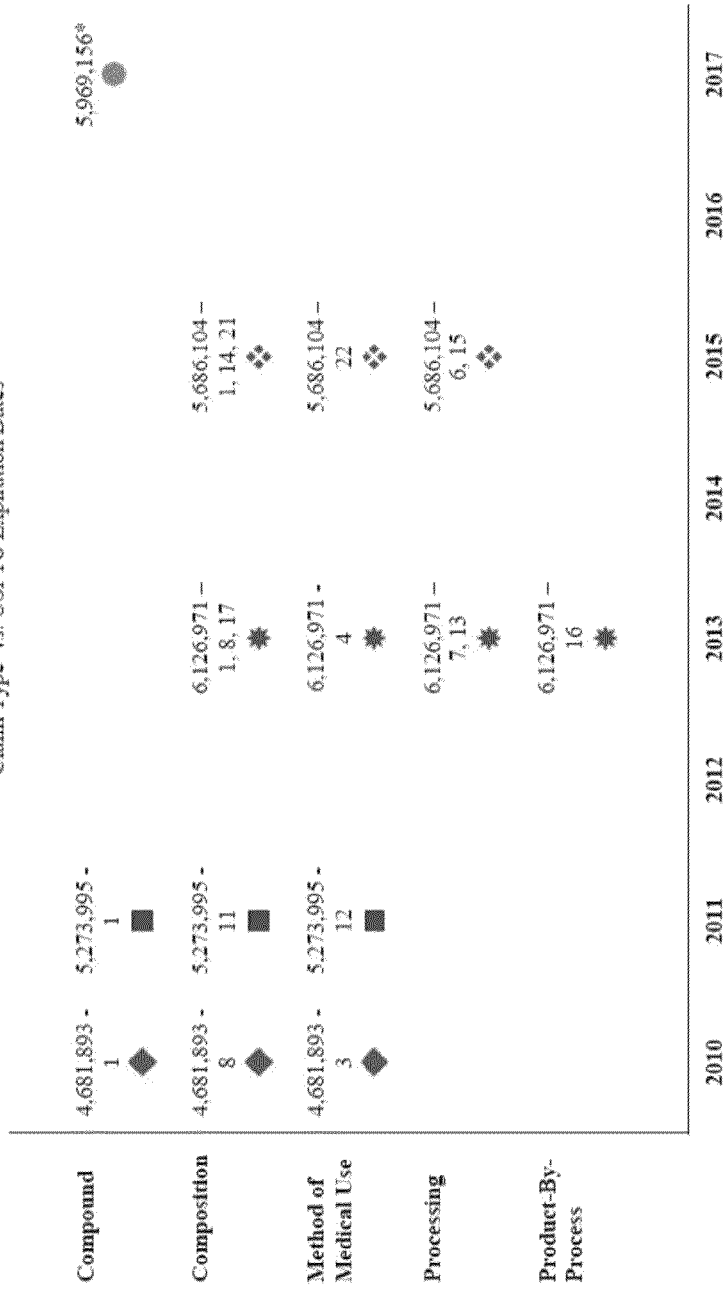
Figure 29:
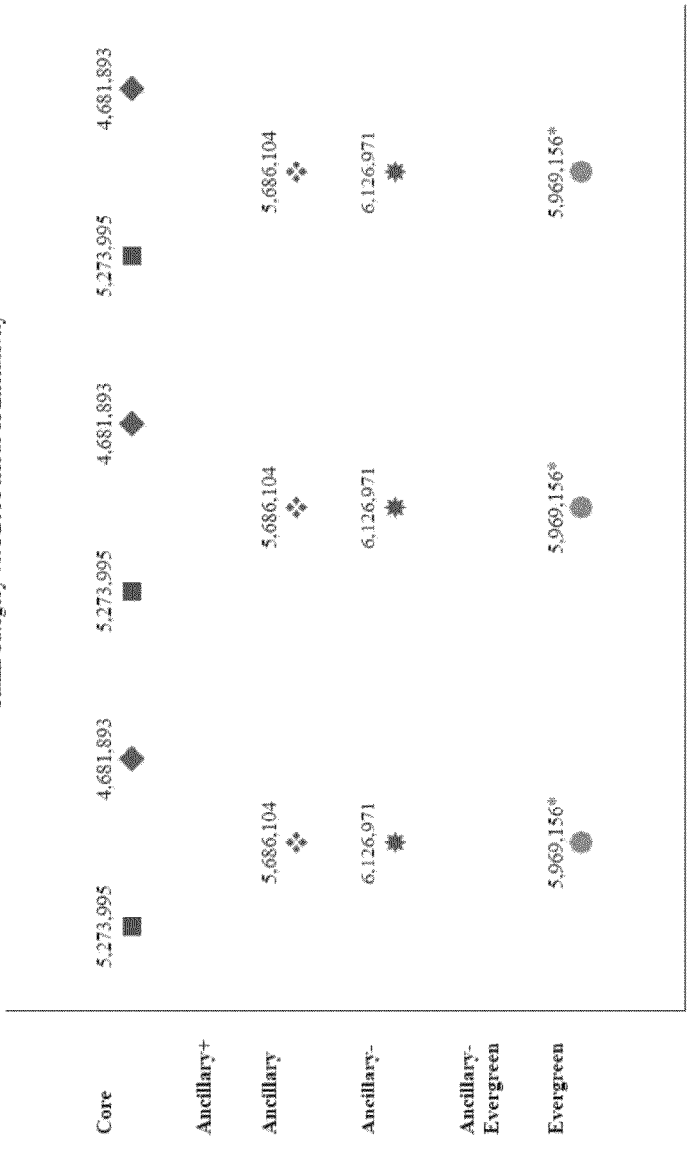
Figure 30:
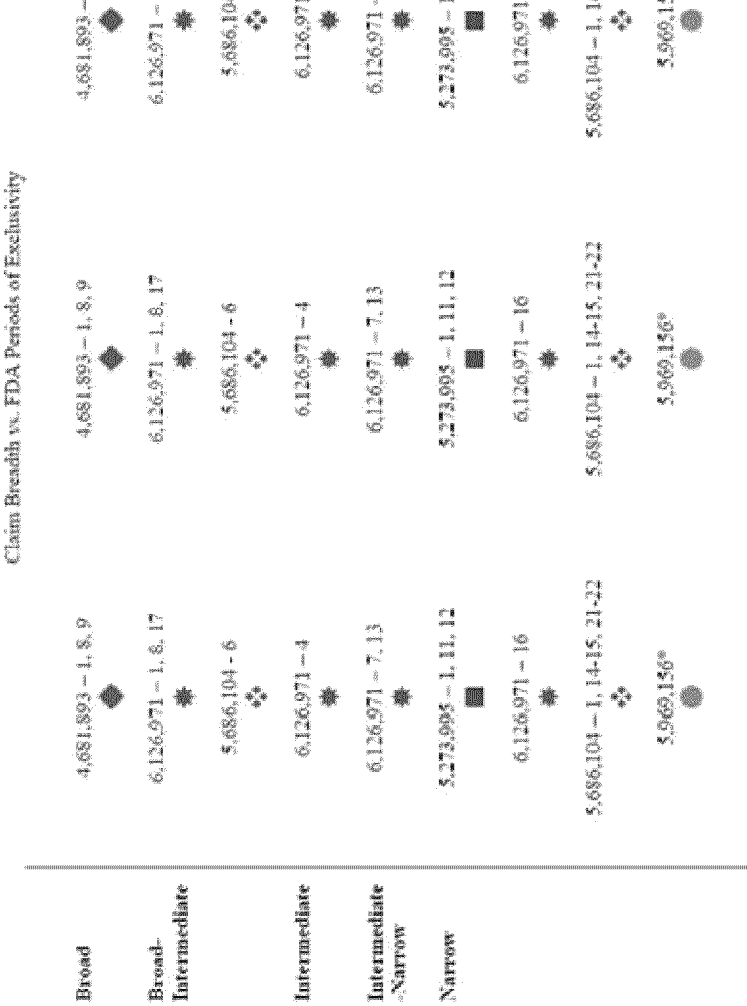

FIG. 23 illustrates a report comparing whether or not a claim reads on a drug product against the breadth of a claim according to an example embodiment. FIG. 24 illustrates a report comparing claim scope against claim type, according to an example embodiment. FIG. 25 illustrates a report comparing claim scope against claim category, according to an example embodiment. FIG. 26 illustrates a report comparing claim category against USPTO expiration dates, according to an example embodiment. FIG. 27 illustrates a report comparing claim breadth against USPTO expiration dates, according to an example embodiment. FIG. 28 illustrates a report comparing claim type against USPTO expiration dates, according to an example embodiment. FIG. 29 illustrates a report comparing claim category against FDA periods of exclusivity, according to an example embodiment. FIG. 30 illustrates a report comparing claim breadth against FDA periods of exclusivity, according to an example embodiment. FIG. 31 illustrates a report comparing claim type against FDA periods of exclusivity, according to an example embodiment. As the example reports above illustrate there exits great flexibility in generating reports which may include comparing disparate subjective indicia or subjective indicia compared to objective patent reference data.

Figure 32:
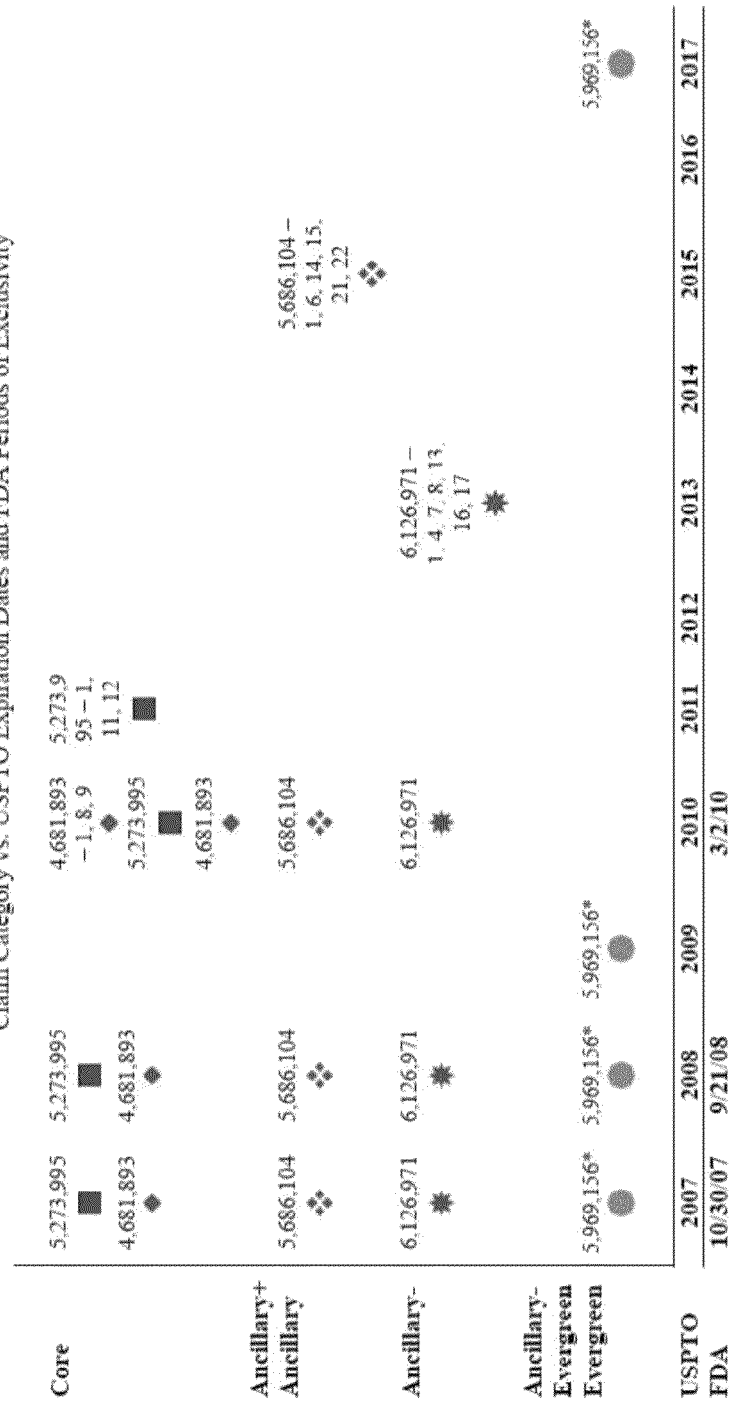

FIG. 32 illustrates a report comparing claim category against USPTO Expiration Dates and FDA periods of exclusivity, according to an example embodiment. FIG. 33 illustrates a report comparing claim breadth against USPTO Expiration Dates and FDA periods of exclusivity, according to an example embodiment. FIG. 34 illustrates a report comparing claim type against USPTO Expiration Dates and FDA periods of exclusivity, according to an example embodiment. As the above example reports illustrate how in some example embodiments, two or more date driven categories may be displayed at the same time. This may be useful in instances where a user wishes to see more than one piece of objective patent data at a time.

Figure 35:
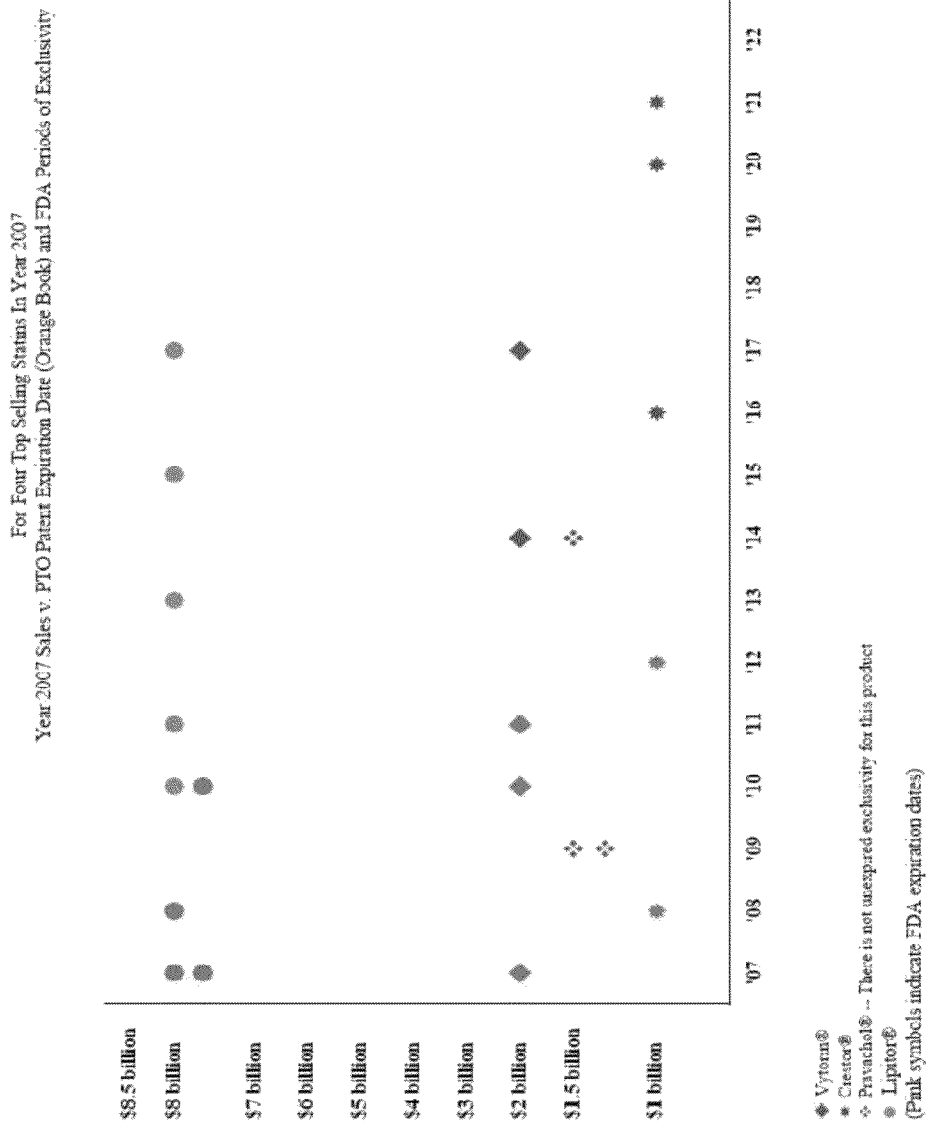

FIG. 35 illustrates a report comparing 2007 sale against PTO Patent Expiration Dates and FDA Period of Exclusivity, according to an example embodiment. This example report illustrates the possibility that a user may wish to have a report of only objective data. In this example embodiment, four different drugs are shown with accompanying expiration dates and exclusivity dates.

Figure 36:
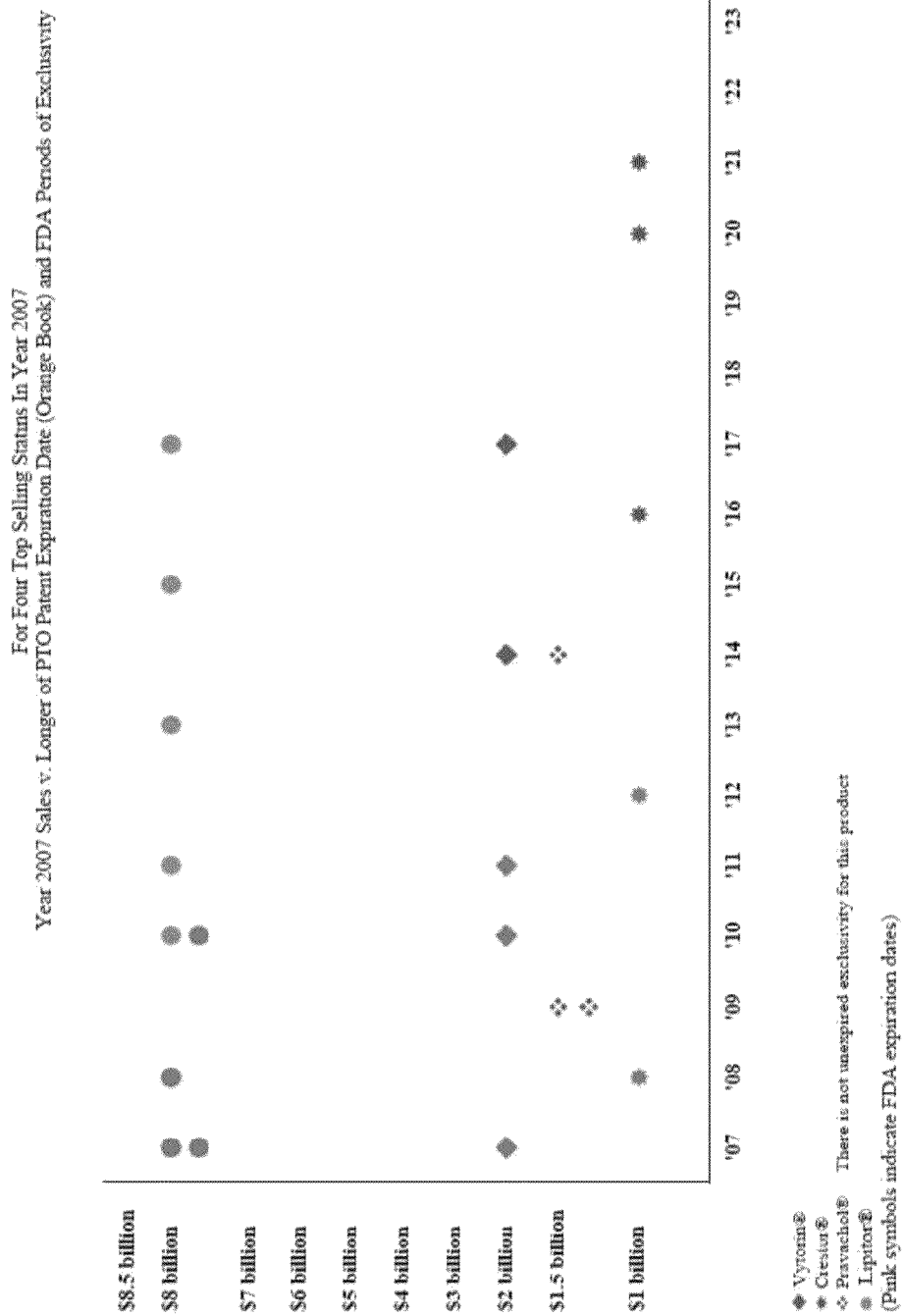

FIG. 36 illustrates a report comparing 2007 sales against the longer of PTO Patent Expiration dates (Orange Book) and FDA Periods or Exclusivity, according to an example embodiment. In some example embodiments, such as FIG. 43, conditional logic may be employed to selectively display only one relative date per drug. In this example embodiment, the two objective data points are compared and only the later of the two dates is shown on the report.

Component Design

Some example embodiments may include the above illustrated methods being implemented as software modules or operations. Common too many of these components (e.g., operations) is the ability to generate, use, and manipulate the above-illustrated data and data sets. These operations, and associated functionality, may be used by the client, server, or peer applications. These various operations can be implemented into the system on an as-needed basis. These operations may be written in an object-oriented-computer language such that a operation oriented or object-oriented programming technique can be implemented using a Visual Operation Library (VCL), Operation Library for Cross Platform (CLX), Java Beans (JB), Java Enterprise Beans (EJB), Operation Object Model (COM), or Distributed Operation Object Model (DCOM) or other suitable technique. These operations are linked to other operations via various Application Programming Interfaces (APIs) and then compiled into one complete server and/or client application. The process for using operations in the building of client and server applications is well known in the art. Further, these operations, and the tiers that they make up, are linked together via various distributed programming protocols as distributed computing components.

Example Storage

Some embodiments may include storage operations (e.g., patent database 212) that facilitate the storage of data wherein tables of data are created, and data is inserted into, and/or selected from, these tables using Structured Query Language (SQL), Multidimensional Expressions (MDX) language, or some other database-related language known in the art. These tables of data can be managed using a database application such as, for example, MYSQL™, SQLSERVER™, Oracle 8I™, 10G™, MICROSOFT ANALYSIS SERVICES™, or some other suitable database application. These tables may be organized into a Relational Data Schema (RDS), Object-Relational-Database Schemas (ORDS), a Multidimensional Cube used in On Line Analytical Processing (OLAP), or some suitable architecture. These schemas may be normalized using certain normalization algorithms so as to avoid abnormalities such as non-additive joins and other problems. Additionally, these normalization algorithms include Boyce-Codd Normal Form (BCNF) or some other normalization or optimization algorithm known in the art. In some embodiments, these tables are data files to be manipulated and managed by, for example, the above referenced applications.

Figure 37:
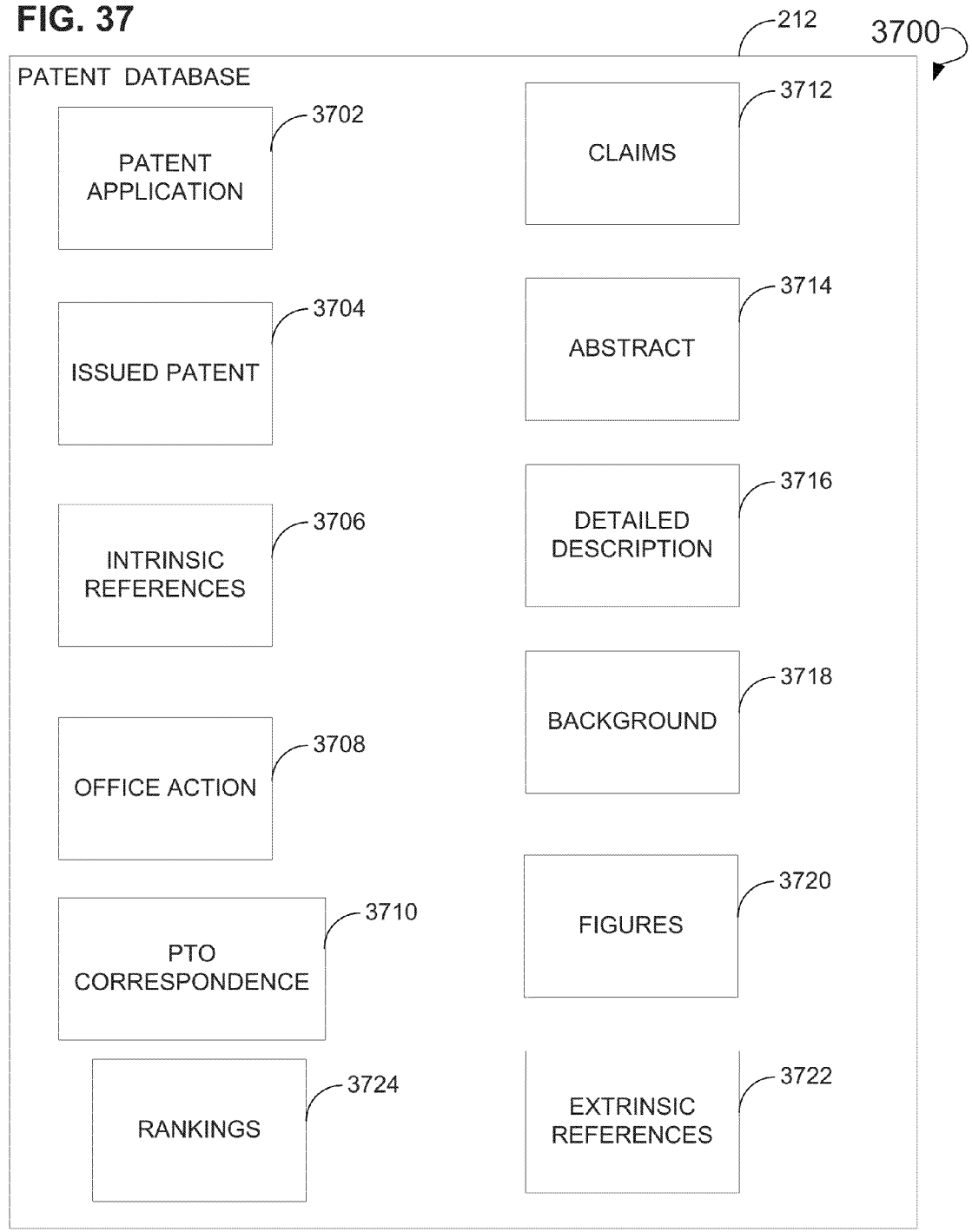
FIG. 37 illustrates a data structure for storing patent-related information, according to an example embodiment.

FIG. 37 illustrates an example of a data structure 3700 for storing patent-related information as may reside as part of, for example, patent database 212. In some embodiments, the patent database 212 may include a patent application file 3702, an issued patent file 3704, an intrinsic references file 3706, an office action file 3708, a PTO correspondence file 3710, a claims file 3712, an abstract file 3714, a detailed description file 3716, a background file 3718, a figures file 3720, an extrinsic references file 3722, and a ranking file 3724.

The patent application file 3702 may be structured to store one or more details related to one or more pending published patent applications. For example, the patent application file 3702 may include one or more fields, such as a title field, a publication date field, an application date field, an application serial number field, an assignee identification field, a U.S. classification field, an international classification field, an inventor identification field, or a foreign priority field.

The issued patent file 3704 may be structured to store one or more details related to one or more issued patents. For example, the issued patent file 3704 may include one or more fields, such as a title field, a publication date field, an issued date field, an application date field, an application serial number field, an assignee identification field, a U.S. classification field, an international classification field, an inventor identification field, a primary examiner identification field, a secondary examiner identification field, a PCT information field, an attorney or agent field, or a foreign priority field.

The intrinsic reference file 3706 may be structured to store one or more details related to intrinsic references. In some embodiments, the intrinsic reference file 3706 includes one or more database tables, which may be linked, such as with a primary/foreign key relationship in a relational database scheme, to one or more tables in the patent application file 3702 or to one or more tables in the issued patent file 3704. One or more tables may be included in the intrinsic reference file 3706 to store one or more references cited during prosecution, one or more office actions or office action responses, one or more affidavits filed by the applicant or examiner, one or more records or telephonic or in-person examiner interviews, or other paper filed by the applicant or examiner.

The office action file 3708 may be structured to store one or more details related to one or more office actions related to a particular patent application or issued patent. The office action file 3708 may include one or more fields, such as a type of office action field, a primary examiner identification field, a secondary examiner identification field, a mailed date field, a patent application reference field (e.g., an application serial number or an attorney docket number), or links to previous or subsequent office actions in a chain of office actions related to a particular patent application or issued patent.

The PTO correspondence file 3710 may be structured to store one or more details related to miscellaneous PTO correspondence related to a particular patent application or issued patent. For example, correspondence related to issuance notification, maintenance fees, status information, interferences, or other papers submitted to or received from the PTO.

The claims file 3712 may include structure to store one or more details related to claims of a particular patent application or issued patent. The claims file 3712 may include one or more fields, such as type of claim (e.g., method, apparatus), parent-child relationships among two or more claims, claim limitations, or claim preamble. The claims file 3712 may be associated with one or more of: the patent application file 3702, issued patent file 3704, intrinsic references file 3706, or the office action file 3708, in various embodiments. For example, claims presented in a particular office action response may be stored in the claims file 3712. As another example, claims, or portions thereof, may be stored and associated with a particular intrinsic reference (e.g., cited patent). In addition, the claims file 3712 may be associated with one or more of the abstract file 3714, the detailed description file 3716, the background file 3718, or the figures file 3720. For example, a particular claim limitation may be related (associated) with a figure, or portion of a figure, as stored in the figures file 3720, where support for the particular claim limitation may be found.

The abstract file 3714 may include structure to store one or more details related to an abstract section of a patent application or issued patent. Likewise, the detailed description file 3716 and the background file 3718 may include one or more fields to store the content of the respective section of a patent application or issued patent. For example, text, tables, in-line figures, mathematical formulae, chemical diagrams, schematic diagrams, or other portions of the background or detailed description of a particular patent may be stored, either separately or combined, in the detailed description file 3716 and/or the background file 3718.

The figures file 3720 may include structure to store one or more details related to one or more figures of a patent application or issued patent. For example, the figures file 3720 may store images (e.g., .tiff, .png, .pdf, or some other suitably formatted image file) of one or more figures. As another example the figures file 3720 may include text illustrating a particular figure. As another example, the figures file 3720 may include a standardized description of one or more figures, for example using an XML file format for drawings, such as .vdx VISIO™ files as provided by Microsoft, Inc.

The extrinsic reference file 3722 may include structure to store one or more details related to one or more extrinsic references related to a patent application or issued patent, such as one stored in patent application file 3702 or issued patent file 3704. The extrinsic reference file 3722 may include one or more fields, such as a title, a date of publication, a cite, a cited portion (e.g., the text corresponding to the cite), an author, a publication source, or the like. Because extrinsic references may be cited by more than one patent application or issued patent, the extrinsic reference file 3722 may be related (associated) with the patent application file 3702 and/or the issued patent file 3704, in various embodiments.

The ranking file 3724 may include structure to store one or more details related to one or more patent claims related to ranking data. The ranking file may include one or more fields, such as a patent claim identification, a ranking category, a ranking for the ranking category, a reason for the ranking, and other information that may submitted to the system that is associated with patent ranking data.

In embodiments, one or more database files 2702-3724 may be structured as one or more tables in a relational database. For example, the patent application file 3702 may be structured to include an assignee table and an inventor table, which may include details about the assignee or inventor, such as name, address, citizenship, or the like. The assignee table and/or the inventor table may be linked using a primary/foreign key relationship with a patent application table to create a normalized database structure. The assignee table and/or the inventor table may further be linked to other tables, such as an issued patent table in the issued patent file 3704 or an intrinsic reference table in the intrinsic reference file 3706.

The database files illustrated above are for illustrative purposes only. In various embodiments, other fields may be used or some fields may not be included depending on the use and structure needed for the database.

Figure 38:
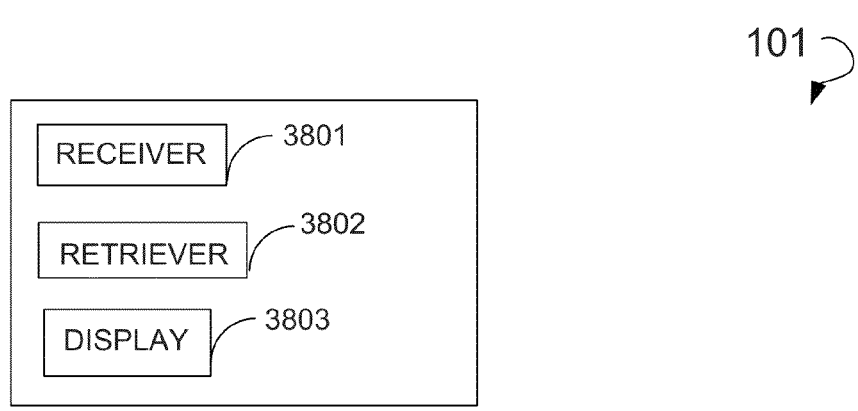
FIG. 38 is a block diagram of a patent analytics system, according to an example embodiment.

FIG. 38 is a block diagram of an example patent analytics system 102. In some embodiments, these blocks may be implemented in hardware, firmware, or even as software (e.g., as software operations with the below illustrated functionality). Illustrated is a computer system comprising a receiver 3801 to receive a search query, the search query relating to a patent, a retriever 3802 to retrieve data relating to a term contained in a claim limitation in the patent, the data including at least one of intrinsic or extrinsic evidence associated with the term by a hyperlink, and a display 3803 to display the claim limitation and the hyperlink. Further, the hyperlink may include a mechanism to present a popup menu containing a plurality of references defining the term contained in the claim limitation. Additionally, the popup menu may display the intrinsic evidence. Some embodiments may include the display 3803 used for displaying a further hyperlink to an electronic document containing the intrinsic evidence. Additionally, the popup menu may display extrinsic evidence. Example embodiments may include the display 3803 used for displaying a further hyperlink to an electronic document containing the extrinsic evidence. Moreover, the hyperlink may include a mechanism to present a first popup menu containing the intrinsic evidence, and a second popup menu containing the extrinsic evidence. The intrinsic evidence may also include at least one of a specification of the patent in which the claim limitation appears, another claim of the patent, or a prosecution history of the patent. In addition, the extrinsic evidence may include at least one of a publication, another patent, expert testimony, testimony of an inventor on the patent, or a dictionary definition.

In further example embodiments, the receiver 3801 receives a first parameter and a second parameter, the first and second parameters indicative of a first and second characteristic of a patent claim, respectively. The retriever 3802 may access first and second parameter values for at least at least a portion of the patent claims in a set of patent claims, the first and second parameter values corresponding to the first and second parameters, respectively. The display device 3803 may present a chart, the chart depicting relationships between the first parameter and the second parameter for at least a portion of the set of patent claims, the relationships represented as one or more data points.

Distributed Computing Components

Some example embodiments may include the previously illustrated components (e.g., operations) being implements across a distributed programming environment. For example, operations providing logic functionality may reside on a first computer system that is remotely located from a second computer system containing an Interface or Storage functionality. These first and second computer systems can be configured in a server-client, peer-to-peer, or some other configuration. These various levels can be written using the above illustrated operation design principles and can be written in the same programming language, or a different programming language. Various protocols are implemented to enable these various levels, and operations contained therein, to communicate regardless of the programming language used to write these operations. For example, a module written in C++ using the Common Object Request Broker Architecture (CORBA) or Simple Object Access Protocol (SOAP) can communicate with another remote module written in Java. These protocols include SOAP, CORBA, or some other suitable protocol. These protocols are well-known in the art.

A System of Transmission Between a Server and Client

In some embodiments, the above illustrated operations that make up the platform architecture communicate using the Open Systems Interconnection Basic Reference Model (OSI) or the Transmission Control Protocol/Internet Protocol (TCP/IP) protocol stack models for defining network protocols that facilitate the transmission of data. Applying these models, a system of data transmission between a server and client computer system can be illustrated as a series of roughly five layers comprising as a: physical layer, data link layer, network layer, transport layer and application layer. Some example embodiments may include the various levels (e.g., the Interface, Logic and storage levels) residing on the application layer of the TCP/IP protocol stack. The present application may utilize HTTP to transmit content between the server and client applications, whereas in other embodiments another protocol known in the art is used. Content from an application residing at the application layer is loaded into the data load field of a TCP segment residing at the transport layer. This TCP segment also contains port information for a recipient application or a module residing remotely. This TCP segment is loaded into the data field of an IP datagram residing at the network layer. Next, this IP datagram is loaded into a frame residing at the data link layer. This frame is then encoded at the physical layer and the content transmitted over a network such as the Internet, Local Area Network (LAN) or Wide Area Network (WAN). The term Internet refers to a network of networks. Such networks may use a variety of protocols for exchange of information, such as TCP/IP etc., and may be used within a variety of topologies or structures. This network may include a Carrier Sensing Multiple Access Network (CSMA) such as an Ethernet-based network. This network may include a Code Division Multiple Access (CDMA) network or some other suitable network.

A Computer System

FIG. 39 shows a diagrammatic representation of a machine in the example form of a computer system 3900 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 3900 includes a processor 3902 (e.g., a Central Processing Unit (CPU), a Graphics Processing Unit (GPU) or both), a main memory 3901 and a static memory 3906, which communicate with each other via a bus 3908. The computer system 3900 may further include a video display unit 3910 (e.g., a Liquid Crystal Display (LCD) or a Cathode Ray Tube (CRT)). The computer system 3900 also includes an alphanumeric input device 3912 (e.g., a keyboard), a User Interface (UI) cursor controller 3911 (e.g., a mouse), a disk drive unit 3916, a signal generation device 3918 (e.g., a speaker) and a network interface device 3920 (e.g., a transmitter).

The disk drive unit 3916 includes a machine-readable medium 3923 on which is stored one or more sets of instructions and data structures (e.g., software) embodying or used by any one or more of the methodologies or functions illustrated herein. The software may also reside, completely or at least partially, within the main memory 3901 and/or within the processor 3902 during execution thereof by the computer system 3900, the main memory 3901 and the processor 3902 also constituting machine-readable media.

The instructions 3921 may further be transmitted or received over a network 3926 via the network interface device 3920 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, and solid-state memories, optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

In some embodiments, a computerized patent claim reference system is illustrated including a claim limitation listing showing one or more claim limitations of at least one claim of a patent; and at least one hyperlink, each hyperlink linking one of the claim limitations to one or more references defining the claim limitation, wherein the claim limitation listing comprises one or more claims. Further, the system is illustrated as having the one or more claims comprise each independent claim of the patent. Moreover, the system is illustrated as possibly having the one or more claims comprise each issued claim of the patent. Additionally, the system is illustrated as having at least one hyperlink comprises a mechanism to present a popup menu of a plurality of references defining the claim limitation. Furthermore, the system is illustrated as having at least one hyperlink that may comprise a list of types of references defining the claim limitation. The system is further illustrated wherein the one or more references defining the claim limitation comprise at least one of extrinsic or intrinsic evidence. In addition, the system is further illustrated wherein extrinsic evidence comprises one or more of: one or more publications, one or more other patents, one or more testimony of experts, a testimony of the inventor, or one or more dictionary definitions. Further, the system is illustrated as possibly having an intrinsic evidence list that comprises a specification of the patent, one or more claims of the patent, or a prosecution history of a patent. Moreover, the system is illustrated as potentially having a Web server operable to present the claim limitation listing and hyperlinks to a user via a Web browser.

A method of storing patent reference data, including storing one or more claim limitations of at least one claim of a patent, and storing at least one hyperlink, each hyperlink linking one of the claim limitations to one or more references defining the claim limitation. The method of storing patent reference data may further include storing the one or more references defining the claim limitation, wherein the one or more references defining the claim limitation comprise at least one of extrinsic or intrinsic evidence. Additionally, the method may further include having the claim limitations and at least one hyperlink stored on a Web server system operable to present the claim limitation listing and hyperlinks to a user via a Web browser. Further, the method may include presenting claim limitations of at least one claim of a patent as a hyperlink, the hyperlink from the claim limitation linking to one or more references defining the claim limitation, wherein the hyperlinks comprise popup menus of references defining the claim limitation. Moreover, the method may include having the hyperlinks comprise references defining the claim limitations sorted by reference type, wherein the one or more references defining the claim limitation comprise at least one of extrinsic and intrinsic evidence.

In some embodiments, a machine-readable medium with instructions stored thereon is illustrated, the instructions when executed operable to cause a computerized system to store one or more claim limitations associated with one or more claims of a patent, and store one or more hyperlinks, each hyperlink linking one of the claim limitations to one or more references associated with the claim limitation.

Example embodiments may include a machine-readable medium with instructions stored thereon, the instructions when executed operable to cause a computerized system to present claim limitations of at least one claim of a patent as a hyperlink, the hyperlink of the claim limitation linking to one or more references defining the claim limitation.

In further example embodiments, a method includes a first parameter and a second parameter being received, the first and second parameters indicative of a first and second characteristic of a patent claim, respectively. First and second parameter values for at least at least a portion of the patent claims in a set of patent claims may be accessed, the first and second parameter values corresponding to the first and second parameters, respectively. A chart may be presented on a display device, the chart depicting relationships between the first parameter and the second parameter for at least a portion of the set of patent claims, the relationships represented as one or more data points. In some example embodiment, a selection of patent claims is retrieved associated with a particular drug. In further example embodiments, accessing the first and second parameter values may include accessing a patent database and obtaining at least one record associated with a patent claim in the patent set.

In an example embodiment, the method further includes the selection of a first data point is detected, the first data point included in the one or more data points. Visualization options may be presented on the display device, the visualization options including: highlighting all related data points, presenting claim language associated with the first data point, and presenting all parameter values associated with the first data point. A visualization preference may be received and the chart may be modified on the display device using the visualization preference.

In another example embodiment, a patent claim is accessed. A plurality of parameters indicative of the patent claim may be presented on a display device, the plurality of parameters including claim breadth, claim type, and claim category. An enumerated parameter value for a first parameter may be accessed, the first parameter selected from the plurality of parameters. An association between the patent claim and the enumerated parameter may be stored, wherein the association is stored in a patent claim entry in a patent claim database.

It is to be understood that the above description is intended to be illustrative, and not restrictive. For example, the above-illustrated embodiments (and/or aspects thereof) may be used in combination with each other. Many other embodiments may be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A computer-implemented method comprising:
   maintaining a database of patent claim entries, the patent claim entries associated with one or more patent documents, and the patent claim entries associated with one or more parameters characterizing a patent claim;
   receiving a search query including a product name;
   providing a report generation interface including:
     at least one patent document related to the product name;
     selectable indicia for the one or more parameters characterizing a patent claim for a first axis of a report chart; and
     selectable indicia for the one or more parameters characterizing a patent claim for a second axis of a report chart;
   receiving a selection of a set of patent documents of the at least one patent document, and a selection of at least one first axis parameter and at least one second axis parameter according to the selectable indicia;
   retrieving from the database, first and second axis parameter data from patent claim entries associated with the set of patent documents;
   providing, using at least one processor, a report chart depicting relationships between the first and second axis parameter data for the patent claim entries associated with the set of patent documents, the relationships depicted as a plurality of data points; and
   receiving a selection of one or more visualization options and modifying the report chart based on the selection, wherein the visualization options comprise: highlighting related data points, presenting claim language associated with a data point, and presenting more parameters associated with the data point.

2. The method of claim 1, wherein the one or more patent documents are selected from a group comprising a patent application and an issued patent.

3. The method of claim 1, wherein the one or more parameters characterizing a patent claim are selected from a group comprising claim breadth, claim type, and claim category.

4. The method of claim 1, wherein maintaining a database of patent claim entries comprises:
   receiving an association between a patent claim entry and a parameter; and
   storing the association in the database.

5. The method of claim 1, wherein providing the report chart includes mapping the at least one first axis parameter as an X-axis and the at least one second axis parameter as a Y-axis on the report chart.

6. A non-transitory machine-readable medium with instructions stored thereon, which when executed by a processor, configure the processor to perform operations comprising:
   maintaining a database of patent claim entries, the patent claim entries associated with one or more patent documents, and the patent claim entries associated with one or more parameters characterizing a patent claim;
   receiving a search query including a product name;
   providing a report generation interface including:
      at least one patent document related to the product name;
      selectable indicia for the one or more parameters characterizing a patent claim for a first axis of a report chart; and
      selectable indicia for the one or more parameters characterizing a patent claim for a second axis of a report chart;
   receiving a selection of a set of patent documents of the at least one patent document, and a selection of at least one first axis parameter and at least one second axis parameter according to the selectable indicia;
   retrieving from the database, first and second axis parameter data from patent claim entries associated with the set of patent documents;
   providing a report chart depicting relationships between the first and second axis parameter data for the patent claim entries associated with the set of patent documents, the relationships depicted as a plurality of data points; and
   receiving a selection of one or more visualization options and modifying the report chart based on the selection, wherein the visualization options comprise: highlighting related data points, presenting claim language associated with a data point, and presenting more parameters associated with the data point.

7. The non-transitory machine-readable medium of claim 6 wherein the one or more patent documents are selected from a group comprising a patent application and an issued patent.

8. The non-transitory machine-readable medium of claim 6 wherein the one or more parameters characterizing a patent claim are selected from a group comprising claim breadth, claim type, and claim category.

9. The non-transitory machine-readable medium of claim 6 wherein maintaining a database of patent claim entries comprises:
   receiving an association between a patent claim entry and a parameter; and
   storing the association in the database.

10. The non-transitory machine-readable medium of claim 6 wherein providing the report chart includes mapping the at least one first axis parameter as an X-axis and the at least one second axis parameter as a Y-axis on the report chart.

11. A system comprising:
   a processor;
   a display device;
   a storage device with a database of patent claim entries, the patent claim entries associated with one or more patent documents, and the patent claim entries associated with one or more parameters characterizing a patent claim;
   one or more computer programs executable on the processor to:
      receive a search query including a product name;
      provide a report generation interface including:
         at least one patent document related to the product name;
         selectable indicia for the one or more parameters characterizing a patent claim for a first axis of a report chart; and
         selectable indicia for the one or more parameters characterizing a patent claim for a second axis of a report chart;
      receive a selection of a set of patent documents of the at least one patent document, and a selection of at least one first axis parameter and at least one second axis parameter according to the selectable indicia;
      retrieve from the database, first and second axis parameter data from patent claim entries associated with the set of patent documents; provide a report chart depicting relationships between the first and second axis parameter data for the patent claim entries associated with the set of patent documents, the relationships depicted as a plurality of data points; and
      receive a selection of a visualization option and modify the report chart based on the selection, wherein the visualization option includes an option selected from a group of options comprising: highlighting related data points, presenting claim language associated with a data point, and presenting more parameters associated with the data point.

12. The system of claim 11, wherein the one or more patent documents are selected from a group comprising a patent application and an issued patent.

13. The system of claim 11, wherein the one or more parameters characterizing a patent claim are selected from a group comprising claim breadth, claim type, and claim category.

14. The system of claim 11, wherein the one or more computer programs executable on the processor are to:
   receive an association between a patent claim entry and a parameter; and
   store the association in the database.

* * * * *